(12) United States Patent
Cruse

(10) Patent No.: US 7,349,761 B1
(45) Date of Patent: Mar. 25, 2008

(54) SYSTEM AND METHOD FOR DISTRIBUTED FACILITY MANAGEMENT AND OPERATIONAL CONTROL

(76) Inventor: Mike B. Cruse, 4868 Dorrance Way, Carpinteria, CA (US) 93013

( * ) Notice: Subject to any disclaimer, the term of this patent is extended or adjusted under 35 U.S.C. 154(b) by 1051 days.

(21) Appl. No.: 10/360,604

(22) Filed: Feb. 7, 2003

Related U.S. Application Data

(60) Provisional application No. 60/355,190, filed on Feb. 7, 2002.

(51) Int. Cl.
G05B 13/00 (2006.01)
(52) U.S. Cl. .................... 700/276; 709/230; 710/11
(58) Field of Classification Search .................... 700/3, 700/275–278, 295; 702/4, 61, 65, 115, 188; 709/217, 230, 244; 710/305, 344, 110, 11
See application file for complete search history.

(56) References Cited

U.S. PATENT DOCUMENTS

| | | | | |
|---|---|---|---|---|
| 5,086,385 A | * | 2/1992 | Launey et al. | ................ 700/83 |
| 5,319,754 A | * | 6/1994 | Meinecke et al. | ............ 710/52 |
| 5,400,246 A | * | 3/1995 | Wilson et al. | ................ 700/17 |
| 5,726,644 A | * | 3/1998 | Jednacz et al. | ........ 340/825.52 |
| 5,831,848 A | * | 11/1998 | Rielly et al. | .................... 700/3 |
| 6,141,595 A | * | 10/2000 | Gloudeman et al. | .......... 700/83 |
| 6,249,241 B1 | | 6/2001 | Jordan et al. | ................. 342/41 |
| 6,353,775 B1 | * | 3/2002 | Nichols | ...................... 700/276 |
| 6,654,750 B1 | * | 11/2003 | Adams et al. | ................ 707/10 |
| 2001/0028646 A1 | * | 10/2001 | Arts et al. | .................... 370/386 |
| 2003/0023601 A1 | * | 1/2003 | Fortier et al. | ................. 707/10 |
| 2003/0151513 A1 | * | 8/2003 | Herrmann et al. | ....... 340/573.1 |

OTHER PUBLICATIONS

International Search Report dated Sep. 8, 2003.

* cited by examiner

Primary Examiner—Jayprakash N. Gandhi
Assistant Examiner—Chad Rapp
(74) Attorney, Agent, or Firm—Myers Dawes Andras & Sherman, LLP

(57) ABSTRACT

An environmental control system controls monitoring and operation of a multiplicity of disparate environmental control devices by determining an appropriate configuration for each control device and communicates corresponding monitoring and control commands to each device in accordance with its corresponding communication protocol over a selected I/O port. An operational instruction set includes a structural definition of an enterprise facility in which devices are defined by personality modules and communicate with a system host in accordance with a protocol defined in a protocol module. Facility implementation is defined by a node tree structure which collects suitable protocol nodes under a corresponding I/O interface port node. Device (personality) nodes are collected under corresponding protocol nodes, and data point nodes depend from their corresponding device nodes. Data points nodes are individually accessible by merely traversing the node tree using a URL-like notational structure, allowing off-site users to control and monitor environmental devices by issuing commands in the form of a URL.

20 Claims, 15 Drawing Sheets

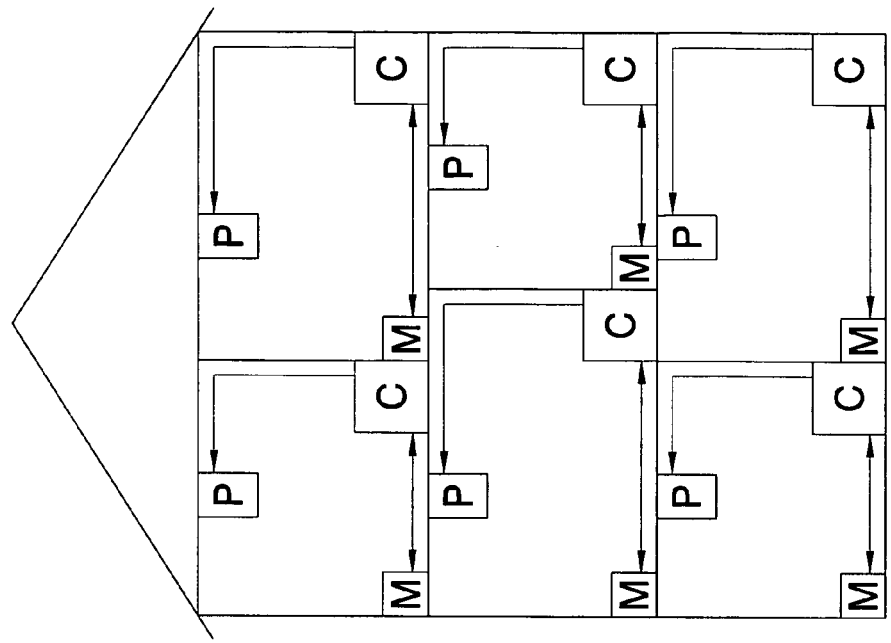
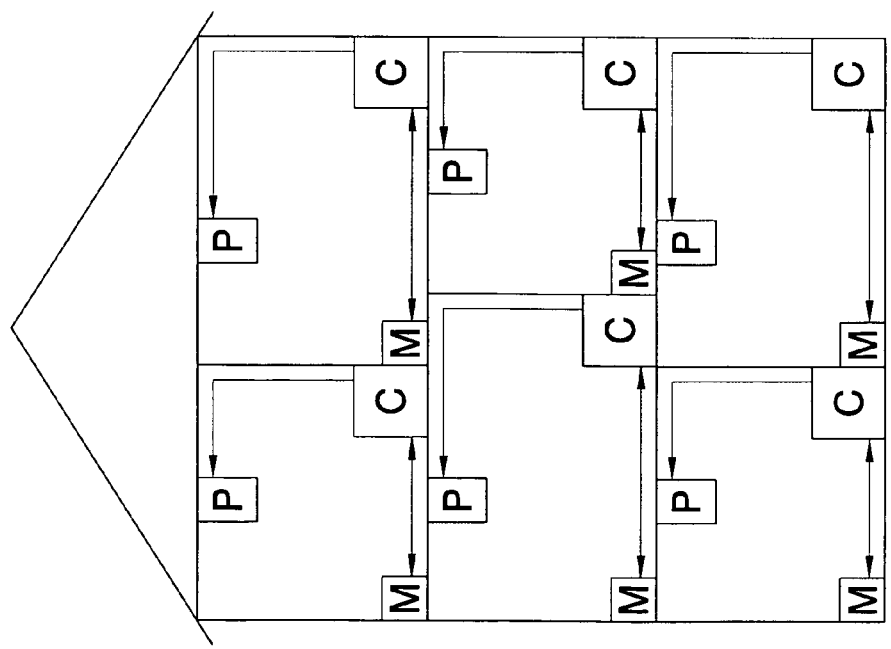
Fig. 1

| Field Name | Hex | ASCII | RTU 8-Bit |
|---|---|---|---|
| Header |  | : |  |
| Device Address | 06 | 0 6 | 0000 0110 |
| Function Code | 03 | 0 3 | 0000 0011 |
| Start Address Hi | 00 | 0 0 | 0000 0000 |
| Start Address Lo | 6B | 6 B | 0110 1011 |
| No. of Registers Hi | 00 | 0 0 | 0000 0000 |
| No. of Registers Lo | 03 | 0 3 | 0000 0011 |
| Error Check |  | LRC | CRC |
| Trailer |  | CR LF |  |

*Fig. 7*

Veris Meter

| "Point" | Register |
|---|---|
| A | Register-1 |
| A.A | Register-2 |
| A-B.V | Register-3 |
| A-C.V | Register-4 |
| A.kW | Register-5 |
| kW.avg | Register-6 |
| A-N.V | Register-7 |
| B.A | Register-8 |
| B.C-V | Register-9 |
| B.kW | Register-a |
| B-N.V | Register-b |
| C.A | Register-c |
| C.kW | Register-e |
| C-N.V | Register-f |
| : | : |
| kW | 40001 |
| kWh | Register-x |
| kW.max | Register-y |
| kW.min | Register-z |

*Fig. 8*

```xml
<node name='/' node_id='1' module='' config_builder='' description='Host S1'>
    <config>
        <property name='hostname' value='mpx.envenergy.com'/>
        <property name='ipaddress' value='192.168.0.1'/>
        ...
        <property name='dns_server' value='ns.envenergy.com'/>
    <config>
    <node name='aliases' node_id='246' module='mpx.service.aliases' description='Global alias namespace'>
    </node>
    <node name='ion' node_id='245' module='mpx.ion.host.mpxs1' description='Global alias namespace'>
        <node name='counter1' node_id='11' module='' description='counter input'>
        <node>
        <node name='counter2' node_id='12' module='' description='counter input'>
        <node>
        .....
        <node name='dallas1' node_id='8' module='' description='dallas bus'>
        <node>
        .....
        <node name=D14' node_id='149' module='' description='logic level on counter1'>
        <node>
        <node name='port1 node_id='2' module='' description='RS232 console port, DB9 connector'>
            <config>
                <property name='flow_control' value='none'/>
                <property name='baud' value='9600'/>
                <property name='parity' value='none'/>
                <property name='bits' value='8'/>
                <property name='stop_bits' value='1'/>
            <config>
        .....
        <node>
        <node name='port4 node_id='5' module='' description='RS232/485 port, RJ45 and Phoenix'>
            <config>
                <property name='flow_control' value='none'/>
                <property name='baud' value='9600'/>
                <property name='parity' value='none'/>
                <property name='bits' value='8'/>
                <property name='stop_bits' value='1'/>
            <config>
        .....
        <node>
        <node name='relay1' node_id='13' module='' description='dry contact closure'>
        </node>
    </node>
    <node name='services' node_id='244' module='mpx.service' description='Services'>
        <node name='network' node_id='250' module='mpx.service.network.network' description='Network Services'>
            <config>
                <property name='debug' value='0'/>
                <property name='enabled' value='1'/>
            </config>
            <node name='ma' node_id='256' module='mpx.service.network.ma' description='RPC service for nodes'>
                <config>
                    <property name='debug' value='0'/>
                    <property name='port' value='S150'/>
                    <property name='enabled' value='0'/>
                </config>
            <node>
        <node>
    <node>
<node>
```

*Fig. 13*

SYSTEM AND METHOD FOR DISTRIBUTED FACILITY MANAGEMENT AND OPERATIONAL CONTROL

CROSS REFERENCE TO RELATED APPLICATION

The present application is related to and take priority from U.S. Provisional Patent Application Ser. No. 60/355,190, filed Feb. 7, 2002, entitled "System And Method For Distributed Facility Management And Operational Control," commonly owned by the assignee of the present invention, the entire contents of which are expressly incorporated herein by reference.

FIELD OF THE INVENTION

The present invention is directed to systems and methods for computerized facility management and, more particularly, to a multiple-protocol presentation and management interface for multiple devices and systems within a facility.

BACKGROUND OF THE INVENTION

The last couple of decades have witnessed a revolution in electronic connectivity and communication technology, particularly when communication and control devices are associated with wide area networks, such as the Internet. Technology has proceeded from a point where simple, stand-alone computer systems performed the majority of computational and control tasks to the present day, where modern systems and techniques have enabled the establishment of enterprise-wide computation, control and communication network systems.

However, this broad network capability often means that the variety of networking situations and solutions is quite large and compatibility between networks, and even various systems within networks, is problematic to say the least. This is particularly true in areas where modern communication networking must interface with legacy hardware and software that was originally designed, configured and manufactured for stand-alone use.

Specifically, in the area of campus or enterprise-wide facilities management, very large numbers of different types of systems and controls are implemented in various structures comprising the enterprise. The systems range from simple voltage and/or current meters to very complex HVAC control systems. Most are offered by different manufacturers and have different communication protocols, installation requirements, and the like, making interoperability substantially impossible. Indeed, most building automation system customers are quite dissatisfied because their different building automation systems are completely non-interoperable.

Compounding this problem is the realization that retrofitting and upgrading older building automation systems requires the entire communication network to be removed and replaced by a different, proprietary system that only functions with the new or upgraded facility tools. Further, although a great deal has been said about real-time data acquisition and processing, there is very little practical interest in such functionality unless it can be employed in some form of enterprise-wide solution. For example, enterprise-wide could refer to 60 retail outlets coupled together into an enterprise network, which is not conceptually difficult until it is realized that 60 different data streams must be managed concurrently; a very difficult implementation, communication and security management problem.

A system that is capable of obviating these difficulties will be highly desirable, especially in view of the recent trend toward resource management, exemplified by load-profiling and load-curtailment in the facilities management field. As more and more facilities attempt to conserve energy by adaptively adjusting power consumption through use management, the ability to control facilities systems on an enterprise-wide basis, and in real-time, becomes mandatory. This requires that new systems be able to handle large numbers of disjoint data streams and additionally, be able to easily accommodate substantially universal interoperability.

Such a system must be able to function as a primary facility system's "agent," providing a common presentation in management interface for all of the devices and systems within a facility. Accordingly, it must interface with all of the different communications protocols implemented by those different devices and systems, collecting data from numerous sources that are otherwise unable to intercommunicate, translating such data into a single format and providing the data to an end user in a uniform presentation form. Conversely, it must be able to receive input from a user in a uniform format and translate it into the specific data that conforms to the control protocols of the various devices and systems populating facility.

SUMMARY OF THE INVENTION

An environmental control system is configured for use in connection with a multi-facility enterprise. The system comprises a microprocessor-based control host, and a multiplicity of disparate environmental control devices, each control device operatively responsive to monitoring and control commands delivered in accordance with one of a plurality of disparate communication protocols. A multiplicity of I/O ports is coupled between the control host and the multiplicity of control devices, the I/O ports including a plurality of communication bus implementations. A configuration database, includes a set of configuration files, each configuration file further comprising an identification of monitoring and control commands corresponding to each of the multiplicity of disparate environmental control devices.

An operational instruction set, the control host operatively responsive thereto, controls monitoring and operation of the multiplicity of disparate environmental control devices by determining an appropriate configuration for each control device and communicates corresponding monitoring and control commands to each device in accordance with its corresponding communication protocol over a selected I/O port.

In one particular aspect, the configuration files further comprise a set of personality module files, the personality module files defining I/O operational characteristics of a particular environmental control device. A set of protocol module files define a characteristic communication protocol of a particular environmental control device, and an association file defines an association between an environmental control device, a particular personality module and a particular protocol module. The protocol module files further define a particular one of the I/O ports as supporting communication between the control host and an environmental control device in accordance with a defined personality module. In this manner, all forms of environmental control devices may be interconnected and operated by merely identifying the device to the system, and identifying its communication protocol. The device personality module contains the characteristic I/O data metrics that are "set" and "read" by a user to control and monitor that device.

Communication protocols are selected from the group consisting of the Modbus, TCP/IP, BACnet, Ethernet, BACnet IP, BACnet MSTP, Dallas, DHCP, PPP, SNMP, and IPSec protocols. The environmental control devices include HVAC, AC and DC power plants, lighting, and thermostat monitoring and control devices. I/O data metrics include temperature, time, Kw hours, voltage, current, "on", "off", all of which are either "set" or "read", or both.

In a further aspect of the invention, the configuration database includes an environmental control system structural definition implemented as a node tree structure. The node tree structure further includes an initial object layer, the initial object layer defining nodes that define physical or logical interactions required to perform an I/O operation to an environmental control device. A device handler layer depends from the initial object layer and comprises nodes each defining a particular one of the plurality of disparate communication protocols. A device layer depends from the device handler layer, the device layer comprising nodes each defining a particular one of the multiplicity of disparate environmental control devices, wherein each device node depends from a particular corresponding device handler node. A data point layer depends from the device layer, the data point layer comprising nodes each defining characteristic I/O data metrics for an environmental control device.

In an additional aspect of the invention, the node tree structure is accessed in accordance with a structural notation conforming to the structural notational requirements of a URL. The control host is coupled to a wide area network, such as the Internet, such that monitoring and control commands for a particular environmental control device are issued by an off-site user by communicating an I/O operational characteristic to the device by traversing the node tree structure with a command configured as a URL.

DESCRIPTION OF THE DRAWINGS

These and other features, aspects and advantages of the present invention will be more fully understood when considered in connection with the following specification, appended claims, and accompanying drawings wherein:

FIG. 1 is a simplified, semi-schematic block level diagram of a representational facilities management implementation in accordance with the prior art;

FIG. 7 is a simplified chart of exemplary Modbus fields including hexadecimal, ASCII, and RTU 8-bit representations FIG. 8 is a simplified list of data "points" available for an exemplary Veris meter and an arbitrary register definition for each "point";

FIG. 13 is an exemplary, truncated, XML configuration file structure, indicating node nesting and definition;

DESCRIPTION OF THE INVENTION

Figure 2:
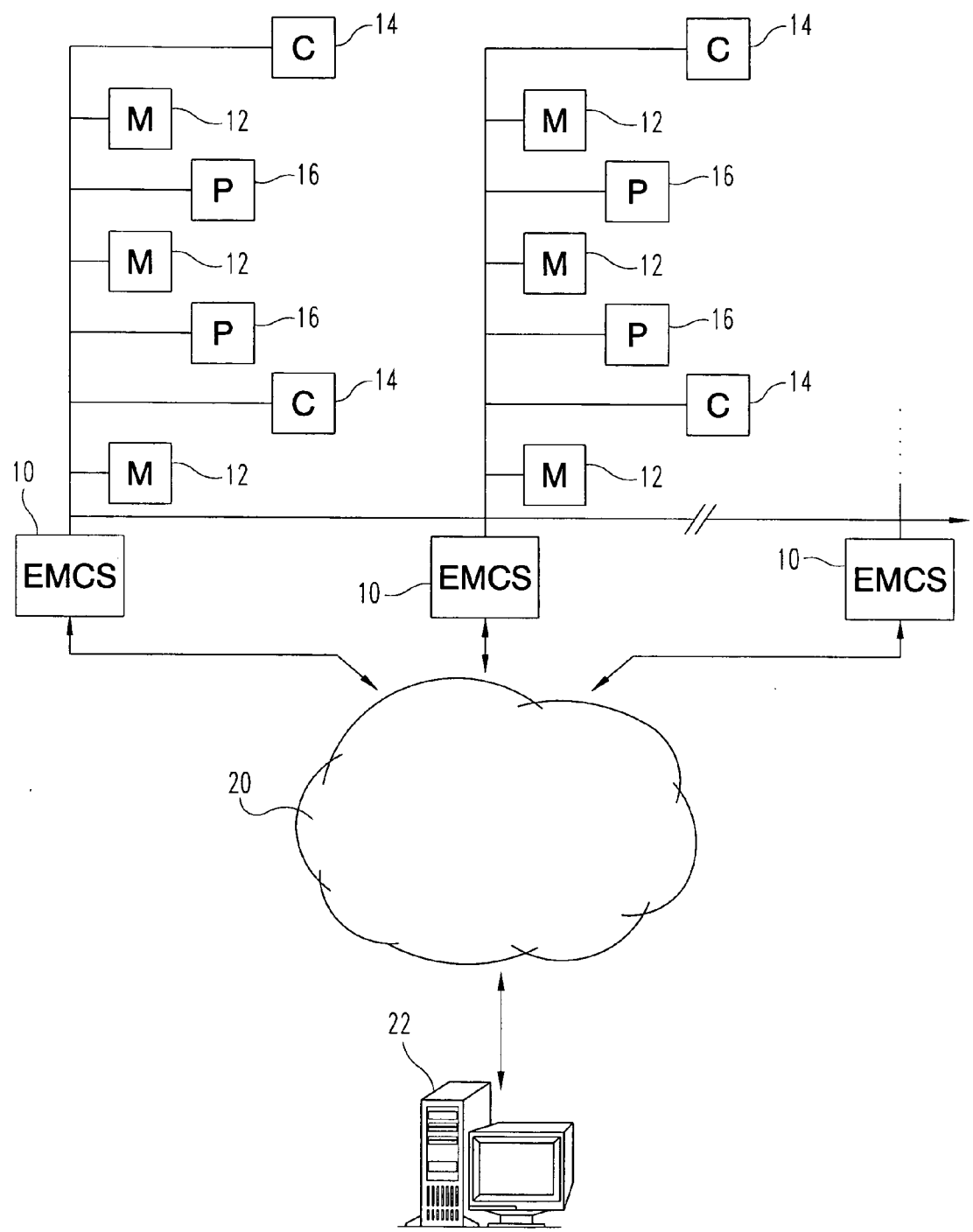
FIG. 2 is a simplified, semi-schematic block level diagram of an exemplary facilities management implementation, in accordance with the present invention.

With regard to the exemplary illustration of FIG. 1, conventional facilities installations are inherently problematic for interoperability purposes because of the number of different apparatus and systems that must be controlled by any type of facilities management device. In the exemplary facility of FIG. 1, a building 10 is illustrated as having a couple of facilities implementations; a physical lighting plant and an HVAC plant disposed about its various floors. Many commercial buildings have a variety of tenants with different operational requirements and power usage (watts per square foot) typical examples include computer centers and phone switching systems (or other electrical operations) with additional cooling loads and much higher electrical energy usage per square foot. If tenants utilize additional operating time (for example on a weekend) the building proprietor needs to determine the additional cost of operating the tenant's space and any HVAC systems required for that space.

Accordingly, control systems must be implemented in a cost-effective manner for monitoring and controlling multi-tenant energy usage. In this regard, a simple lighting plant becomes particularly complex, when it is understood that a lighting plant comprises not only the lighting fixtures themselves, but also the power metering associated with the fixtures and a certain degree of "zone" control, such that the lighting plant can be activated or deactivated in accordance with particular tenant requirements.

Additionally, HVAC systems require temperature monitoring controls, timers, activation/deactivation switches, as well as HVAC plant itself. This too is rather complex since it typically comprises adjustable ducting, fans, refrigeration plants, heating plants, and other air handling equipment.

The problem is compounded when it is realized that each and every one of these individual components can be characterized as comprising one of a number of different classes of apparatus; a control, a meter or a plant. Controls might be exemplified as a system that responds to an environmental rule set in order to issue a "control" signal to a plant. A plant is typically considered physical construct, such as a lighting fixture or air conditioning unit, that responds to an on/off signal or some analog intermediate value such as "dim," "slow," or the like. Plant operation is typically evaluated by meters which might measure kilowatt hours, for example, or temperature, mass flow, or any other environmental factor that a "control" should respond to. Controls, meters and plants are interconnected, such that a control evaluates a characteristic or metric received from a meter, compares the metric or characteristic to an environmental rule set (reduce lighting after 5:00 p.m.) and issued an appropriate signal to the plant to effect the environmental rule.

Each of the classes of systems, controls, meters, and plants, each function in accordance with their own type of communication protocol which might be analog, digital, electromechanical, or a mixture of the three. Conventionally, controls, meters and plants are coupled together in hard-wired fashion, with an overall environmental system control unit pre-programmed to understand each of the proprietary protocols by which each of the proprietary system classes communicate. In the exemplary embodiment of FIG. 1, the illustrated building is replicated to represent a campus environment which suggests that the above-mentioned interoperability problems are compounded when the number of facilities plants are increased. Systems deployed in a first building might not be controllable by a facilities management system designated to operate the campus as a whole and, indeed, might not even be recognized if the component elements were manufactured by a different manufacturer and communicated in accordance with a different proprietary protocol.

In accordance with the present invention, a system is provided that allows for simple and efficient interconnection between and among all categories of facility component parts (controls, meters and plants). The system, termed an Environmental Monitoring and Control System (EMCS), is depicted in the exemplary embodiment of FIG. 2. As shown in the exemplary illustration, an environmental control system 10 is configured to communicate between and among all categories of facilities equipment populating any particular environment. In the environmental control system 10 is coupled to various metering devices 12, control systems 14 and plants 16. Further, each environmental control system 10 is configured to communicate with other, similar environmental control systems either by direct communication connection 18 or through a wide area network 20, such as the Internet. Accordingly, the environmental control systems need not be linked together directly and therefore are not required to be placed in proximity with one another. Campus facilities or enterprise facilities may each be provided with an environmental control system that monitors and controls individual building environments, with the perimeters of each environment able to be passed to additional environmental control systems through an Internet connection, for example.

Further, and in accordance with the present invention, a multiplicity of environmental control systems are able to be accessed by a centralized user authority, such that the information regarding environmental factors that each environmental control system is responsible for may be accessed by a system administrator no matter where the system administrator or the environmental control systems are physically located. The system administrator is then able to provide programming data to each environmental control system and extract, process and visualize a data set collection relating to the totality of the environment for which each environmental control system is responsible.

By way of example, in a load curtailment situation, an energy provider might experience a serious peak load demand for power because of an external environmental factor, such as particularly severe weather, or the like. In response to such a peak demand, an energy supplier provides an indication to participating customers that load curtailment is in effect. In response, load curtailment participation customers provide a signal to their physical plants in the geographic area for which load curtailment is designated. At the plant side, a load curtailment rule set is implemented which might, for example, reduce power by turning off a certain proportion of lights in a building or shutting down portions of the building entirely. Temperature set points might be adjusted to reduce the HVAC power requirements, and the like.

In the context of the present invention, load curtailment rule sets are developed for each of the environmental control systems by the customer, with the rule sets residing either on the customer's administration server 22 or alternatively, residing within each environmental control system and accessible to the customer through a network connection.

In addition to the load curtailment exemplar, the environmental control system, in accordance with the invention, is particularly suitable for a centralized environmental monitoring and control, particularly in the case of a multi-facility enterprise which might be established nationwide. Each facility within the enterprise necessarily has differing environmental requirements, each of which may be individually monitored and controlled by a customer (enterprise) server 22. The customer (enterprise) defines various environmental zones within an establishment, temperatures for those zones, lighting requirements, power consumption characteristics, and the like, with configuration data either residing in the customer server or communicated to the individual environmental control system which operates the specific establishment. Further, and in a manner to be described in greater detail below, configuration data is provided in a manner that allows each environmental control system to affirmatively communicate with all categories of controlled facilities equipment, regardless of the manufacturer of that equipment or the protocol by which it communicates. Establishment systems may be easily upgraded, or even changed altogether, with minimal impact on the environmental control systems' ability to access and control the newly added devices. All that need to be done is to inform the affected environmental control system what the newly added device is, how to communicate with the newly added device and what to say. Rule sets are therefore easily adaptable to changing physical conditions within an establishment and indeed are easily susceptible to modification if newly added physical plant members offer particular economies of their own. A lower power consumption HVAC system, for example, will allow a rule set to be modified in order to set lower trigger thresholds for load curtailment.

Figure 3A:
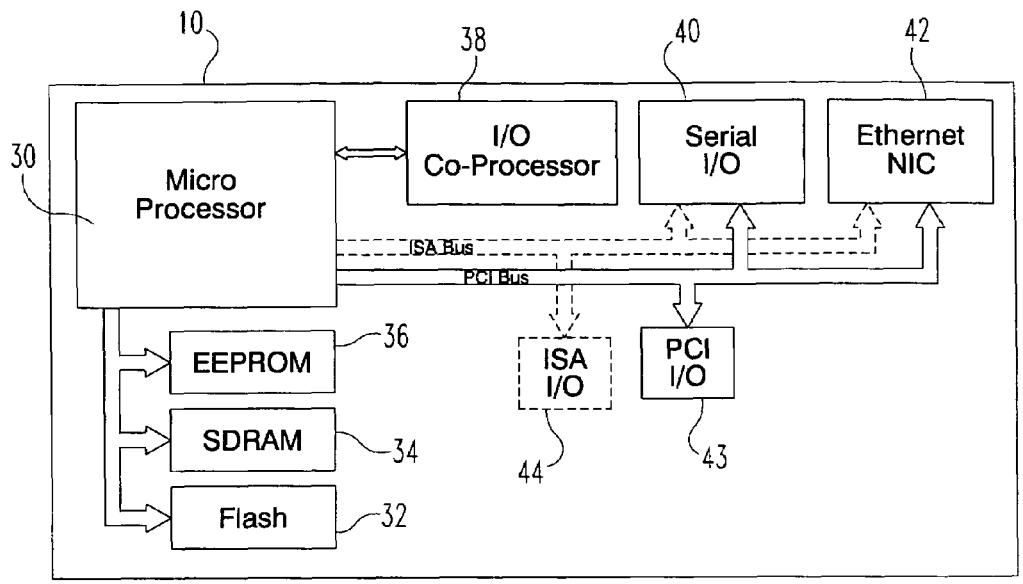
FIG. 3A is a simplified block level diagram of a facilities management and control system suitable for practice of the present invention.
Figure 3B:
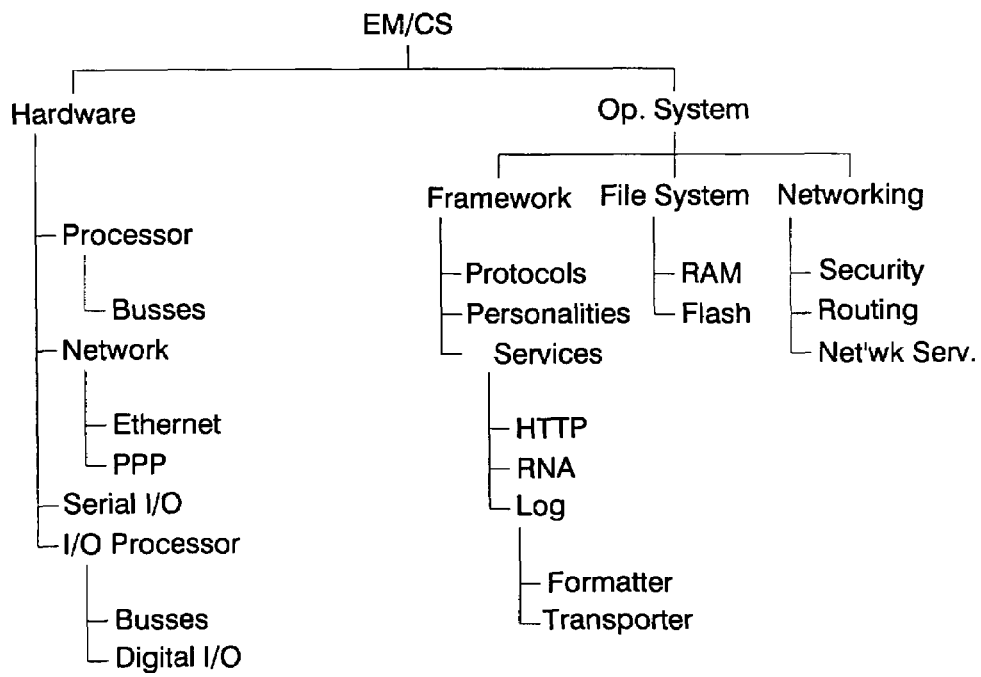
FIG. 3B is a simplified structural representation of a facilities management and control system including hardware and software application implementation.

A simplified, block-level diagram of an environmental monitoring and control system, in accordance with the invention, is depicted in the exemplary embodiment of FIG. 3. Briefly, the environmental monitoring and control system, indicated generally at 10, is a microprocessor-based device specifically adapted to function as a monitoring and control host in environmental control systems such as depicted in FIG. 2, whether distributed or otherwise. The EMCS functions as a facility systems agent, providing a common presentation and management interface for all categories of devices and systems within a facility. An EMCS achieves this functionality by interfacing with all of the different communications protocols but typically used by these devices and systems. Data is collected from numerous sources that are otherwise unable to intercommunicate and translated into a single format suitable for presentation to a customer user.

Architecturally, an EMCS is a purpose-built embedded personal computer (PC) operating under microprocessor control. An exemplary microprocessor 30 might be a ZF-x 86, manufactured and sold by ZF microsystems, of Palo Alto, Calif. Microprocessor 30 is a 32-bit Pentium equivalent processor running at 120 MHz and hosting a full PCI bus and a full ISA bus, with ISA bus implementation being optional. The EMCS further includes 32 MB of compact flash memory RAM 32 coupled to microprocessor 30, and 32 MB of SDRAM 34, running at 66 MHz, which functions as a solid-state hard drive. At power-up, the EMCS application loads from SDRAM 34 into flash RAM 32 and executes therefrom. A 16 MB boot flash resides on an EEPROM 36 and is used primarily for booting the system, but is contemplated as being large enough to potentially allow other applications to run as well.

A satellite processor 38 interfaces to the microprocessor 30 through an internal parallel port to provide counter and relay outputs, as well as defining a Dallas I/O bus. Satellite processor 38 suitably comprises an AT90S8535, manufactured and sold by Atmel Corporation of San Jose, Calif. Satellite processor 38 is suitably configured as a low-power 8-bit micro controller which features an 8-channel, 10-bit ADC, a programmer UART, one 16-bit and two 8-bit timers, and 32 programmable I/O lines.

Additional I/Os provided to the system 10 through standard serial I/O ports 40 and ether net ports 42 coupled internally on the PCI bus or alternatively, the ISA bus. Further expandability is accommodated by providing a PCI bus connection 43 for future expansion, including devices such as wireless, power line carrier, and the like. Similar functionality may be optionally provided by an ISA bus connection 42.

Integrated circuit components, comprising the system 10 are arrayed on a 6-layer printed circuit board populated with a combination of surface-mount and through-whole components. The printed circuit board is enclosed in an aluminum sheet metal housing, depicted in the exemplary embodiment of FIG. 4, that is designed to minimize electromagnetic emissions, resist physical damage to internal components, and keep out dust and other environmental contaminants. The housing is constructed with a width dimension of approximately 8.2 inches, a depth dimension of approximately 6.2 inches (without mounting tabs) and a thickness dimension of approximately 1.0 inches. Mounting tabs might be provided at the four corners of the housing and which, in combination with the housings' compact dimensions, facilitate installation of the system in locations where space is limited.

Figure 4:
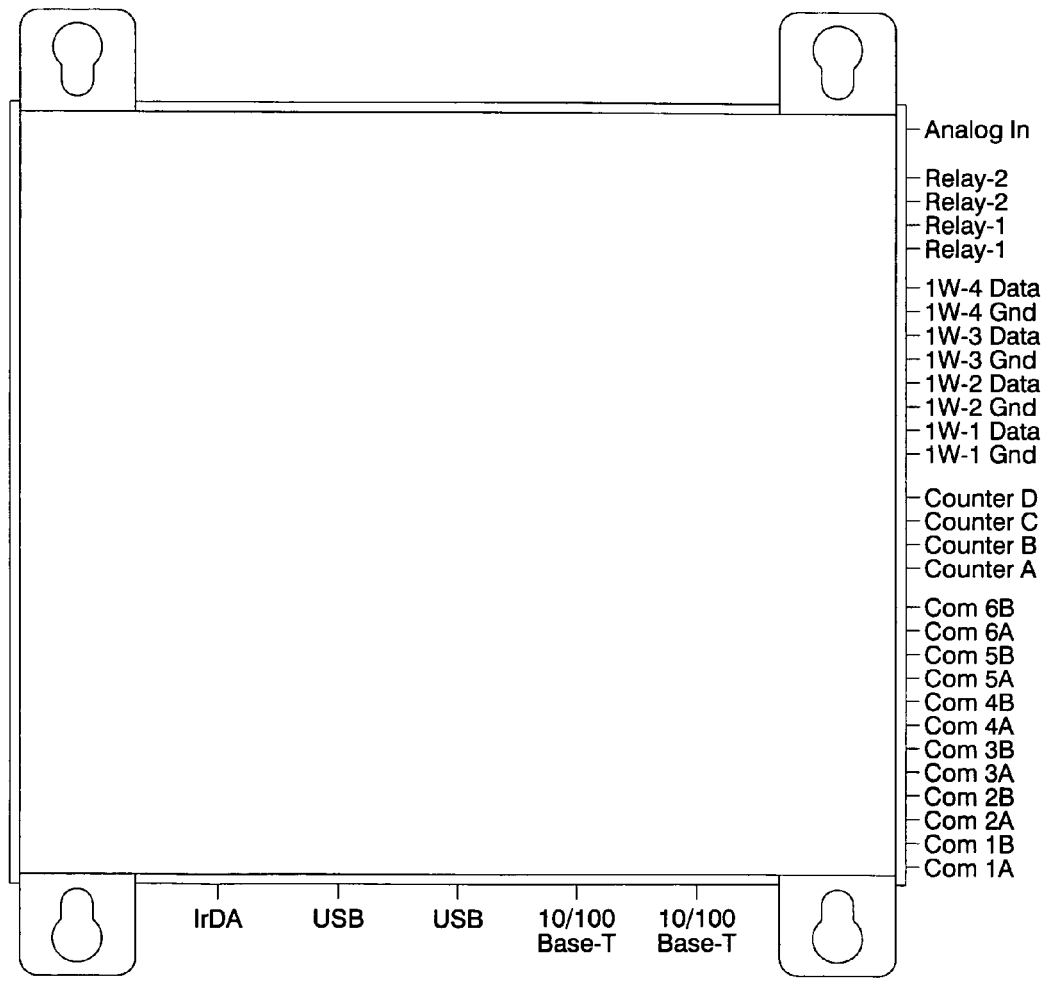
FIG. 4 is a simplified plan view of a housing configuration for the facilities management and control system of FIG. 3A.

As depicted in the exemplary embodiment of FIG. 4, the system comprises six serial ports; two RS-232 ports, two RS-485 ports and two ports that are configurable either as RS-232 or RS-485. There is also provision for an optional IrDA infrared data link port in order to allow for communications with a PDA, such as a Palm Pilot, or other such devices. When installed and activated, the infrared data link port replaces one of the RS-232 ports. Advantageously, functionality of the port can be switched under software control between operation as an infrared data link port or as an RS-232 port. Conventional DIP switches are used to configure the RS-485 serial ports to be either terminated or non-terminated. These switches are mounted externally in order to allow the port to be changed from one state to the other without removing the cover of the housing. Further, the system includes two 10/100 Base-T Ethernet ports for network connectivity. The system further includes an analog DC voltage input, with the scale being defined by the user. The analog input provides 10-bit analog-2-digital resolution defined by an A-to-D converted on the satellite processor (38 of FIG. 3). This input can be suitably used for a thermistor input or a O-10V input (single-ended, not differential).

For Dallas numeral one-Wire ports are protected with low capacitance clamping diodes, that are specifically designed for protecting Dallas buses, the ports include active pull-ups to keep band widths maximized for distributed I/O. Two standard USB 12 Mbit ports utilize conventional USB connectors, and include power control under software for powering USB devices on the USB bus, without requiring a power supply on the USB device. Finally, the system includes two opto-isolated solid-state relay outputs, with outputs of one Amp at 120 VAC.

In terms of physical implementation at the housing, four DB-9 connectors are provided for the RS-232 ports and two RJ-45 connectors are provided for Ethernet connections. Additionally, two 16-pin Phoenix connectors support the counters, Dallas bus ports, relays, analog voltage input and RS-485 ports.

It will be evident to one having skill in the art, that the novel system is an embedded device, having no moving parts. The system features a journaling file system, that stores information on a flash memory device for particular robustness in harsh environments. As implemented, for example, the system is resilient against random power failure events that typically cause file system corruption in other, conventional systems.

Further, the environmental control system supports a terminal console interface and additionally supports an infrared interface so as to be able to provide configuration via a PDA. Internet connectivity is currently supported by dynamic host control protocol, which allows a user to set such things as the IP address, the subnet, the gateway and the host name, all of which would be part of any particular systems' URL. The user configures these items through a console port from a personal computer using conventional serial interface software. The system supports both static and dynamic web pages, with the limitation on static web pages being purely a function of the amount of memory available on the system. With an exemplary 32 MB flash memory, approximately 10 MB of memory are available for static web page hosing.

In this regard, the 32 MB of flash memory may be easily increased if required. Of the total, 22 MB is presently utilized for system software and application processing, as will be described in greater detail below, with 10 MB free for applications or web page hosting. An application of moderate complexity (a PID loop or a load shedding application, for example) can be written in approximately 350 lines of Python code, which represents about 10 kB of flash usage. The remaining memory is available for storage of graphics; approximately 500 pages can be stored, estimating an average page size of between 10–20 kB.

A key advantageous feature of the system of the present invention is that it is physically configured to be able to host and run a particular software application suite, as will be described in greater detail below. The particular application software suite architecture is adapted to support dynamic facility system configuration in a manner wholly different from a conventional hard-coded representation of a site. The system software architecture has been designed such that it is not tied to any single platform or technology but, since the hardware adaptation of the environmental control system (10 of FIG. 3) was designed to support this software it is therefore the optimal platform for it. The software architecture provides the structure on which a system, that represents a site, is built. It also provides the functionality to assemble the system from configuration data and subsequently provides the operating environmental in which that system runs. Consequently, any site configuration may be represented in software including existing systems which can be modified or extended easily and quickly, without requiring shutdown.

The EMCS application is based on a Linux kernel, which is a Unix-like, Posix-compliant, (source, fully-featured operating system that provides true multi-tasking, multi-threads, virtual memory, shared libraries, demand loading, shared copy-on-write executables, proper memory management, loadable device driver modules, video frame buffering, and TCP/IP networking. The EMCR application allows the system to run many services and protocols at the same time, and still be able to respond to events such as load curtailment signals. Linux is a modular and scalable operating system and is therefore ideal for embedded systems such as the EMCS hardware depicted in FIG. 3.

The environmental control system, in accordance with the invention, can be expressed as a software application suite having two main components. The first, as described above, is the operating system software, which is based on the most recent version of the Linux Kernel. The second, is the software application that provides the core functionality of the environmental control system and is termed the "framework" herein for convenience of reference. Specifically, the framework may be viewed as an application suite that is able to perform a number of unique functions in the context of the hardware system of the invention. A fully-operational control system is assembled from configuration data files maintained in system memory, as will be described in greater detail below. Raw data, received from various categories of connected facilities devices, is processed and data from disparate sources is presented to a user in a uniform format. The system functions to "get" and "set" various values that are operationally returned from various connected categories of facilities devices and/or cause them to function operationally.

Advantageously, framework software provides services such as data logging and HTTP services and provides an environment for custom system configuration and for developing custom site definitions. The framework software, therefore, provides a structure on which a system is built that represents a particular site for which environmental monitoring and control is desired. It also provides the functionality to assemble the system from configuration data and then provides the operating environment in which that system runs. Consequently, any site configuration is easily represented in software and can be modified or extended easily and quickly, without requiring system shutdown. Although the framework software application suite is described as running under the Linux operating system, and in conjunction with the hardware configuration described in connection with FIGS. 3 and 4, it will be evident to one having ordinary skill in the art that the applications and methodologies described below can be made to run on any platform or under any operating system currently in use. Further, its technology independence allows it to be easily updated to incorporate advances in hardware and operating system technology.

Before going into detail about the structure and functionality of the framework software application, it will be useful to consider the following description as to how communication is made to various categories of devices and how the particular communication protocols, as well as specific device characteristics, form an underpinning for the framework application architecture. It is well understood by those having skill in the art that various pieces of facilities equipment communicate between and among one another in accordance with variously defined communication protocols. One of the more common languages employed by environmental controllers is the Modbus protocol. This protocol defines a message structure that compatible controllers recognize and use, regardless of the type of networks over which they communicate. Modbus (and protocols in general) describes the process a controller uses to request access to a device, how it will respond to requests from devices and how errors will be detected and reported. Characteristically, the Modbus protocol establishes a common format for the layout and content of message fields. During communication with Modbus compatible devices, the protocol determines how each controller knows its device address, recognizes a message addressed to it, determines the kind of action to be taken and how the controller will extract any data or other information contained in the message. If a reply is required, the controller constructs a reply message and will transmit it using the Modbus protocol.

Figure 5:
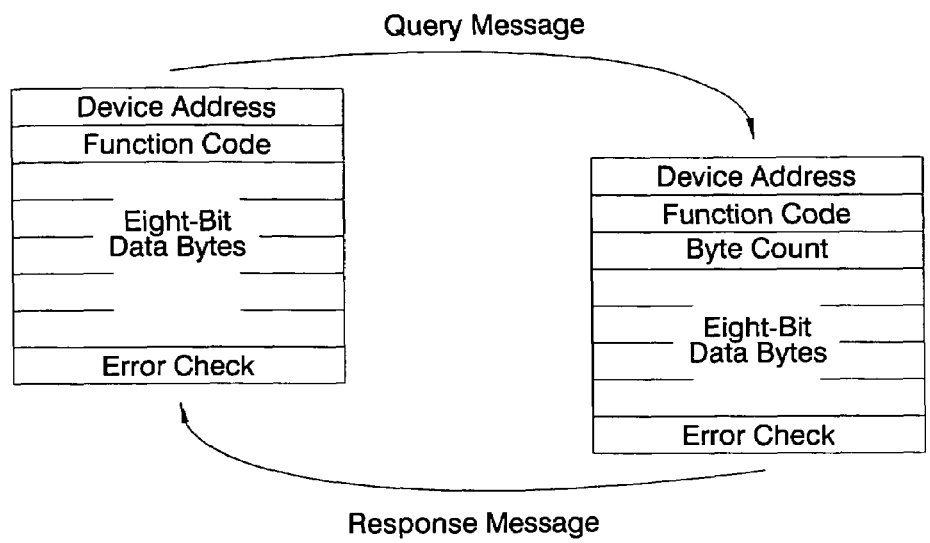
FIG. 5 is a simplified query/response message exchange in accordance with a Modbus protocol.

Standard Modbus ports use an RS-232 compatible serial interface that defines connector pinouts, cabling, signal levels, transmission baud rates and parity checking. The Modbus protocol is a packet protocol and, as depicted in the exemplary embodiment of FIG. 5, comprises a message header, including device address information, and the like, and a data field which comprises messages, data, commands and particularly register definitions of address devices for which the queries, commands and messages are directed.

In a similar fashion, individual devices that are controllable through a protocol such as Modbus are configured to provide specific forms of information through a set of internal registers, with the register addresses, content and format all being understood by the communication protocol. For example, in the case of a Veris 8036 meter, it is well understood that energy consumption in kilowatt hours (KWh) is contained within Register 4000. Obtaining the latest value of energy consumption from a particular Veris 8036 meter coupled into an environmental system requires only that a controller "get" KWh from "Register 4000." The protocol used to communicate with the Veris 8035 understands how to format the request, retrieve the desired information and present it to the controller in an intelligible fashion.

Several categories of devices are manufactured and sold to operate in accordance with a generalized Modbus protocol. Other categories of devices are manufactured and sold to operate under different protocols that are not necessarily compatible with Modbus. Examples of other types of protocols which are routinely implemented in facilities management include; TCP/IP, BACnet, ETHERNET, BACnet IP, BACnet MSTP, Dallas, DHCP, PPP, SNMP, and IPSec. This list of protocols, while representing the major system communication protocols, is certainly not exhaustive. Indeed, the Modbus protocol itself is implemented in several forms, including Modbus TCP, adapted for internet communication architectures. Similarly, there are not only large numbers of different facilities equipment manufacturers, but also large numbers of categories of facilities equipment, each adapted to communicate over a characteristically structured protocol. For example, Trane and Alerton Technologies are well-known manufacturers of HVAC equipment that utilize BACnet as a communication protocol. AC and DC power plants, manufactured by Capstone Turbine and Generac necessarily utilize slightly different communication protocols because of the inherently different nature of the equipment being communicated with and controlled.

The present system obviates these difficulties by establishing individualized protocol modules for each of the well-known protocols conventionally used to communicate with facilities equipment. Further, new protocols, extensions, and customized adaptations, as they are developed, each form the basis of an individualized protocol module, identified by the name of the protocol and collectively stored in system memory as a set of "device handlers" that can be accessed and utilized as a protocol driver when communication with a supported device is required. Each protocol module contains the functional definition of the protocol, including the function codes that are supported as well as the structure of field contents of a message. An exemplary Modbus field content diagram and list of exemplary function codes is given in FIG. 6.

Figure 6:
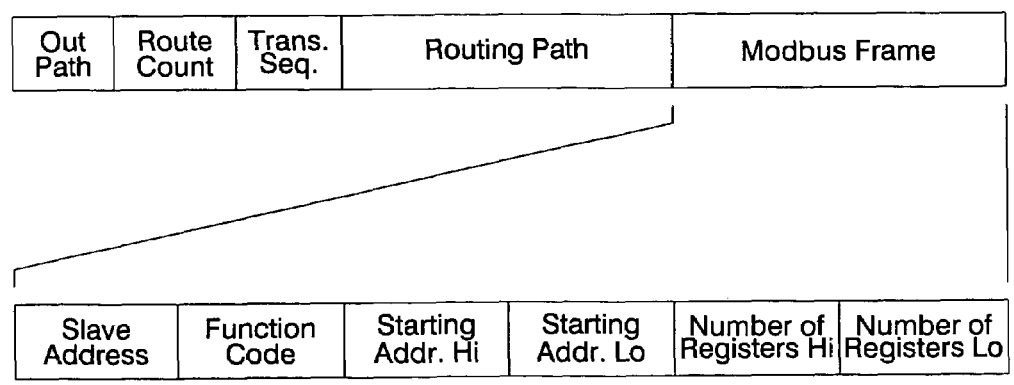
FIG. 6 is a simplified message field structure suitable for a Modbus protocol.

In the Modbus exemplar of FIG. 6, a Modbus message is structured to identify a communication partner by its "slave address" and define the function code for the action desired. For example, and in accordance with an exemplary Modbus query set forth in FIG. 7, a "read holding registers" request might be made to slave device address 06, requesting data from holding registers 40108, 40109, and 40110. All that is required, therefore, is to understand how a protocol message is structured and be able to determine how to populate the various fields of the message. Although described in terms of a Modbus exemplar, it will be understood that protocol modules can be simply constructed for any suitable communication protocol, so long as the structural parameters of the protocol are known.

Populating the various fields of a protocol message with appropriate information requires that the data characteristics of a device to be communicated with are understood. For example, the above-mentioned Veris 8036 or Veris 9171 meters, each are able to acquire and store a number of different characteristic metrics, each relating to various aspects of power usage, energy consumption, and the like. An exemplary list of the various data elements available from a Veris 8036 meter, for example, are depicted in FIG. 8, with an arbitrary register number designation beside each entry. For example, a reading of energy consumption in KWh may be found in Register 4000. As will be described in detail below, each of the characteristic data metrics are termed "points" in the context of the innovative system, with each individual device defining its own set of "points" and the access means by which those "points" are "set," "read," "modified," and the like.

A "personality" module is constructed for each individualized device and includes a listing of the "points" corresponding to that device. Additionally, each personality module includes a command code, register identifier, or the like, associated to each of the points such that a personality module, in combination with an appropriate protocol module, contains all of the information required to carry out any command with respect to a particular device. The personality module containing specific register locations for specific kinds of data, the protocol module defining how that information is structured to be communicated to the device.

Figure 9:
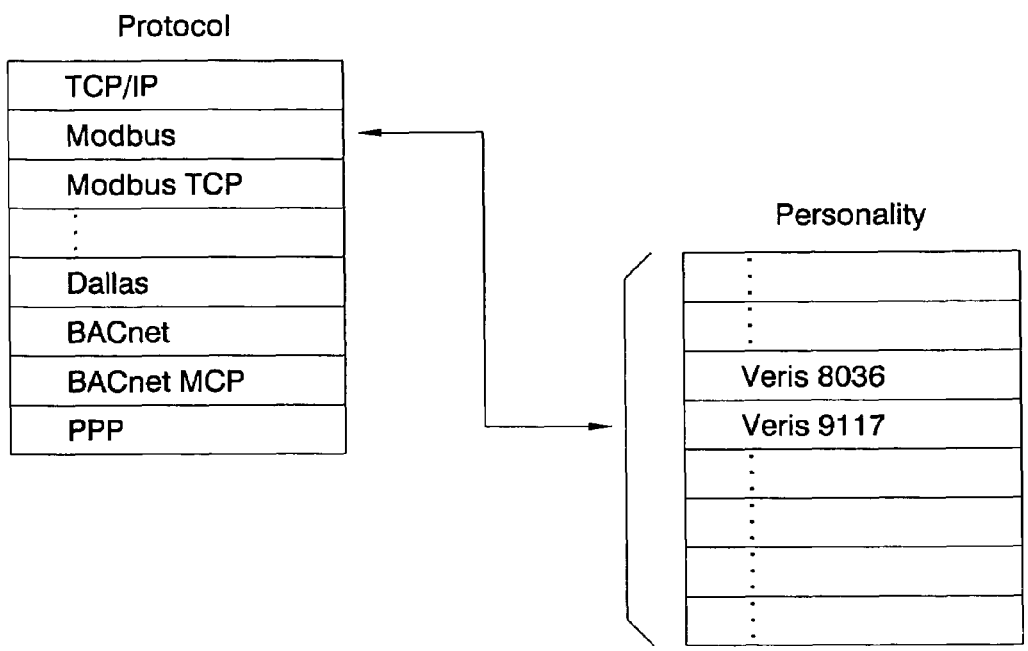
FIG. 9 is a simplified structural diagram illustrating protocol and personality module associations.

As depicted in the exemplary embodiment of FIG. 9, each of the personality modules is associated to a particular one of the protocol modules; Veris meters associated to the Modbus protocol, for example. Which devices communicate in accordance with which protocol are well understood by those having skill in the art and indeed, are so identified by the device manufacturer. Association between a "personality" (device) and a "protocol" is maintained in an association file, with each protocol identified to all of the corresponding devices which operate in accordance with that protocol. Thus, if one were to access the Modbus protocol, one would obtain a list of all of the different devices that operate in accordance with that protocol. Further, each protocol is necessarily adapted to be supported by a particular physical communication plant; standard Modbus ports use an RS-232 compatible serial interface, Dallas compatible devices communicate over a No. 1-wire Dallas communication bus, etc. As the protocol modules are constructed, each protocol module further includes a port definition with which its communication methodology is compatible. Protocol modules are mapped to the multiplicity of I/O ports defined by the novel systems' hardware architecture (depicted in FIGS. 3 and 4) such that a complete system functional architecture may be defined with only a single personality "point" as a starting point.

For example, in the case of the exemplary Veris 8036 meter, where it is desired to monitor energy consumption in kilowatt hours, the meter will necessarily respond to communication queries utilizing the Modbus protocol. Since the protocol is Modbus, the physical connection between the meter and the environmental control systems' hardware will be made through one of the RS-232 serial interface ports comprising the hardware architecture.

Similarly, various fluorescent lighting installations and certain thermostatic control systems such as the LUX 9000, are particularly suitable for interconnection over a No. 1-wire Dallas bus architecture. Where, for example, a LUX 9000 thermostatic control system comprises a personality module, an associated protocol module might associate a TINI (Tiny InterNet Interface) protocol to the LUX 9000. Since TINI is configured to run on a 1-wire bus, it is associated to one of the Dallas ports comprising the systems hardware architecture. And so it proceeds from device to device (personality to personality).

Likewise, a system definition can be obtained in reverse, with a port definition generating a list of all of the protocols supported by that port, with each protocol generating in turn a list of supported devices or personalities, each of which have an associated list of "points." System definition in this manner allows the system to be flexibly modified without impacting any of its current content and, as will be described below, without impacting its continuing operation during the modification process. It will be immediately understood that as additional protocols become available, only an additional protocol module need be prepared in order to adaptively configure the system to operate in accordance with that protocol. Further, as protocols evolve over time and different devices are manufactured to take advantage of such protocol extensions, these devices may be simply added to the process by preparing their own individualized personality modules that might include an extended register set definition, for example, and to implement those devices by preparing a suitable protocol module defining an evolved message structure capable of recognizing and interacting with the extended register set.

Depending on how a protocol extension is defined, or how additional device capabilities are implemented, it should be understood that existing protocol modules might certainly be able to accommodate enhanced device capabilities, just as extended protocol definitions might be able to handle legacy devices defined for an earlier protocol revision. Thus, the degree of flexibility in a system defined in such a manner vastly exceeds that which is conventionally available in the art and uniquely defines a system which is completely hardware independent.

Further, and in accordance with the present invention, a protocol module not only determines how to format a packet to send down a particular communication interface wire, but also functions to format and assemble communication packets on-the-fly, from data taken from a designated personality module. The system need only be instructed to "get value=KWh" in order for a packet to be constructed and transmitted to a particular device responsible for that "variable." The "get" command, as well as the value of the "variable" (KWh) requires that the command code (in a Modbus application) be a read code (03, for example). KWh is a variable of a Veris meter and the Veris personality module defines the register name for that value of the "variable." The register name is passed to the protocol module which assembles the message string identifying the address of the device, the function code and the register data in order to extract a value for KWh.

Personality and protocol modules form the basic functional constructs which enable the systems' framework software architectural definition. As described above, system configuration is dynamic in that a system, representing a site, is assembled from configuration data, including personality and protocol modules. Further, and in a manner to be described below, the methodology by which a site configuration is created allows for a site to be completely defined, down to the finest detail grain, in terms of a URL (Uniform Resource Locator)-like structure that resembles a file path. By virtue of this definitional context, any "point" within the system definition is accessible by an outside user, having access to a simple PC and having a URL address for a desired "point." In a more general sense, and as will be described in greater detail below, an outside user invokes a "service" by its URL address and then uses the "service" to traverse the entire system in a simple and efficient manner.

A representation of a site is defined and presented by assembling a tree structure of objects, termed nodes. In the context of this description, a node is a named entity that is able to exchange information with other defined nodes (for example, a port, a Modbus handler, a point, or the like). Additionally, a node is an entity that supports information exchange, such as an entity defining an HTTP service. In one aspect, nodes are used as collection or departure points that represent the relationships between and among a collection of objects comprising the system.

Figure 10:
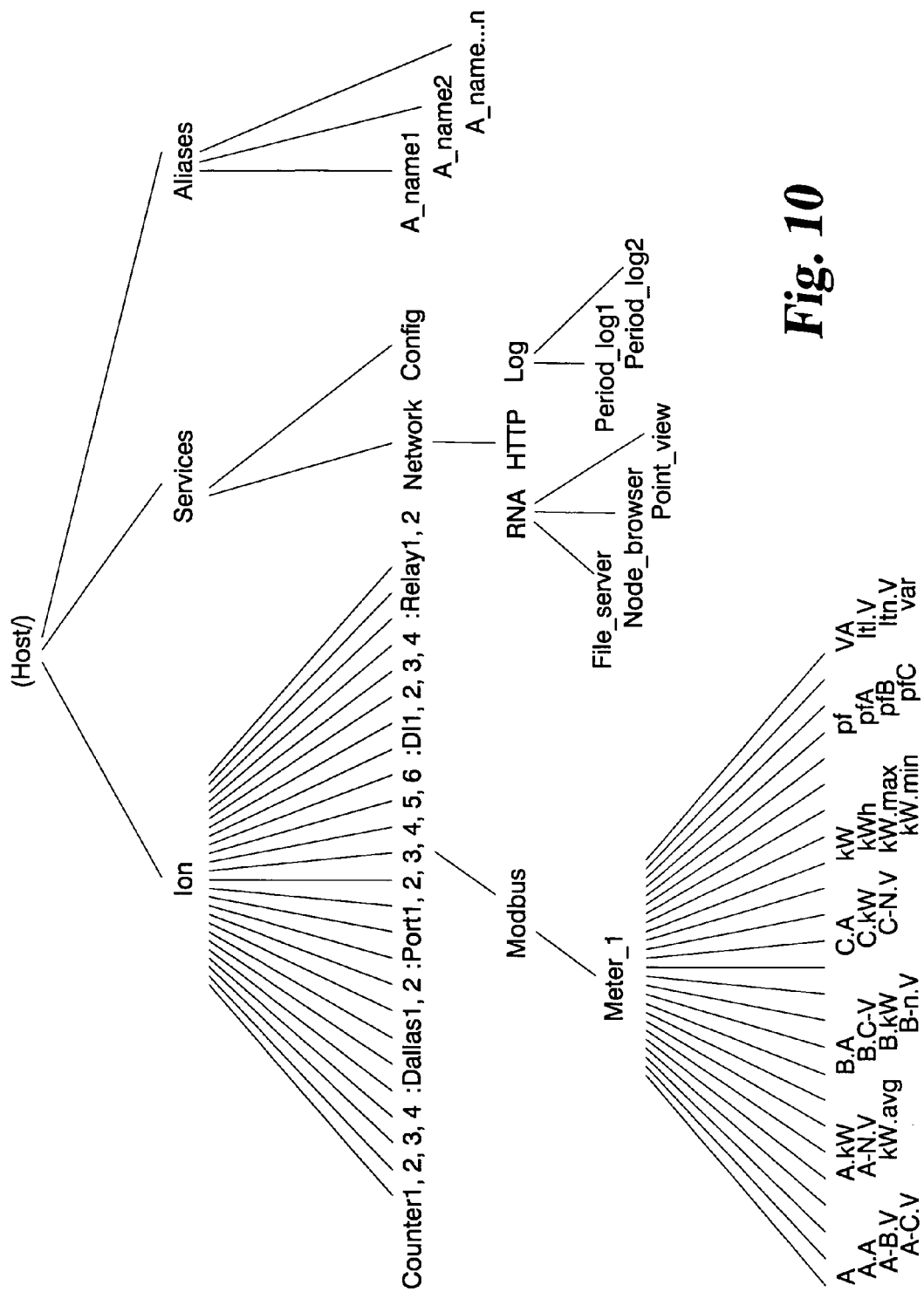
FIG. 10 is an exemplary representational node tree structure in accordance with the invention.

Turning now to FIG. 10, there is shown an exemplary embodiment of a framework application node tree structure, for an exemplary hardware system such as depicted and described in connection with FIGS. 3 and 4, above. The top level (root) of the node tree defines the system host, which is represented, for reasons to be described below, by a forward slash (/). In the exemplary system of FIG. 10, the host is an environmental control system, having a hardware configuration as defined in connection with FIGS. 3 and 4, and a standardized software configuration including certain services and functions that will be described further. It should be noted that the host could be any kind of PC running the framework software application or even another purpose-built or embedded system having a different configuration of IO ports. These alternative pieces of hardware would differ from the exemplary embodiment of FIG. 10 in the number of ports, port definition, or the like, which would require only minor modification to the configuration definition.

Under the root level, the tree structure comprises three main branches, termed Ion, Services and Aliases. These nodes, also termed anchors, define the roots of the three main branches of the node tree that is constructed by the framework application and represent the three main classes of functionality supported by the system.

The Ion anchor is the root of the Ion branch of the node tree. Necessarily, all of the nodes in the Ion branch are referred to as Ions and an Ion (abbreviated from and referring to I/O Node) being an object that participates in the physical or logical interactions required to perform an Input Output operation. Thus, a node that reads a value, sets a value, or supports these functions, comprises an Ion. Therefore, Ions include all of the I/O ports, the device handlers (protocol modules) associated with the ports, the devices (personality modules) associated with the device handlers, and the data "points" associated to each device.

Accordingly, the Ion branch of the root tree contains the definitional structure of all of the hardware elements comprising an environmental control system, and the communication protocol elements associated to the hardware structure. One may traverse the Ion branch and, in so doing, construct a list of all supported ports, all supported protocols, all supported devices and all controllable data associated with the devices.

The Services anchor is the root of the services branch of the node tree which define nodes that perform an action. Services depending from the Services anchor include the HTTP server, a data logger, a remote node access service, and might also include other utility applications that a system architect might wish to provide. In the exemplary embodiment of FIG. 10, the previously-mentioned services are collected in an intermediate node termed "network," with the Services anchor further including a sub-node termed "Configuration." Further, the HTTP services node might further be subdivided into individual object nodes that each represents a particular service utility, such as file server access, a node browser, point viewer, or the like. The data logger node might represent a hierarchical entry point for a set of a multiplicity of periodic logging utilities, each of which may be configured for acquisition of periodic log data from any one of the data "points" defined in the Ion tree structure.

The above-described service objects are collected under a "network" node since the system is contemplated as being particularly suitable for access over the Internet. The service objects described in connection with the exemplary embodiment of FIG. 10 represents services that are frequently invoked, rationally related to one another and indeed, comprise a number of common software object blocks. "Configuration" services are almost always run in foreground and involve a collection of utilities that are relatively infrequently accessed. System configuration, while conceptually simple, involves particularly unique functionality that will be described separately below.

The Aliases anchor is the root of the Aliases branch of the node tree. An Alias, in the context of the invention, is an alternative name that can be assigned to a node in order to allow users to assign a meaningful descriptive term to any node on the local system, as well as to nodes on a remote system. An Alias functions like a redirector pointer, such that when an alias is configured, along with an alias name, it is assigned to the node to which it refers as an argument. Once the system is running, a call to the alias will invoke and return the public interface to the node to which the alias is assigned. For example, if a user wishes to monitor room temperature with a specific temperature sensor, the user might assign the alias "room temperature" to the nodal definition of that temperature sensor. When an object (a service utility, for example) looks up an entered name like "room temperature," it first tries to navigate to "room temperature" as if it were a fully-specified path in the definitional tree. Upon failing to find the term "room temperature" under the Ion or Services anchors, the object searches for "room temperature" under the Aliases anchor and, if found, the object returns the public interface of the node (the specific temperature sensor) to which the alias name refers.

From the system's structural definition as illustrated in the exemplary embodiment of FIG. 10, it is easy to understand how system node definitions can be identified and accessed in accordance with a particular structural notation that suitably conforms to the structural requirements of a URL. The structure resembles a funnel path made up of objects with parent-child relationships. For example, men /Ion/Port 3/Modbus/meter_1/max.kW Uniquely identifies a data "point" max.kW, as a node whose parent node is a Veris meter personality, whose parent node is a Modbus line handler, whose parent node is Port 3, whose parent node is the Ion anchor, and whose parent node is the host device. Because every node has a name, and every node has a parent going up to the root node in the name space, the system is able to identify and access any node within the configuration structure in accordance with its URL name. Thus, the top level (root) of the node tree is represented by a forward slash (the forward slash sign). Information appearing in front of the root designator might comprise the identity of the particular host, particularly in implementations where a remote user is communicating with a multiplicity of environmental control systems scattered across the various establishments of an enterprise.

Because of the large number of potential nodes, and the length of the file definition for each data point, the advantageous features of the Aliases branch of the node tree become apparent. For example, the particular temperature sensor which is designated for acquiring room temperature information might have an address of:

/Ion/Dallas_1/temp_1 or /Ion/Dallas_1/tini/temp_1.

Constructing a "room temperature" Alias allows a user to construct a very simple command in order to extract information from that temperature sensor. Information extraction would involve a very simple command string such as "get variable=room temperature," as opposed to "get variable=/Ion/Dallas_1/tini/temp_1."

Figure 11:
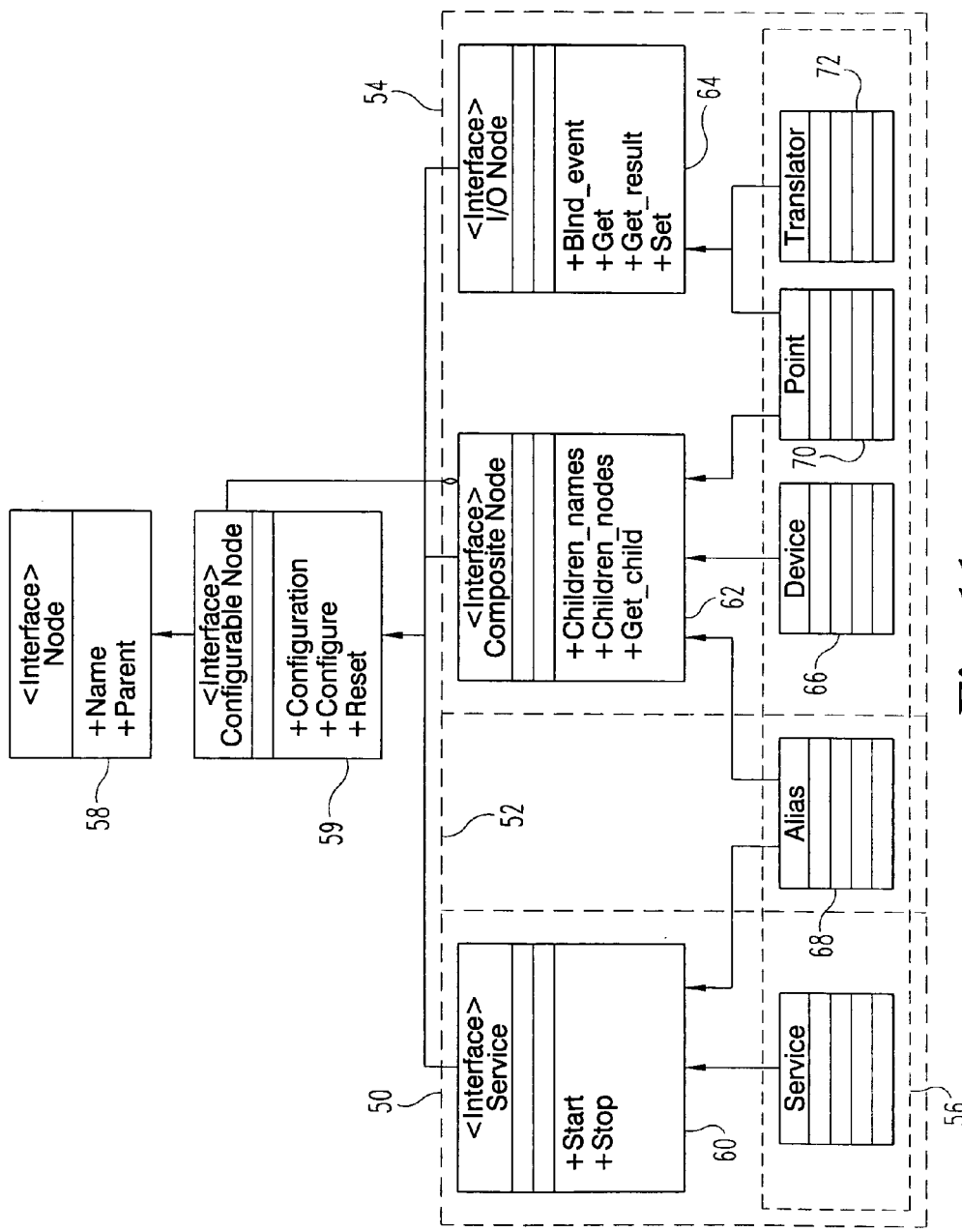
FIG. 11 is a simplified structural diagram in Unified Modeling Language of an exemplary core architecture implementation.

The core architecture of the framework application in accordance with the invention, is illustrated in the simplified UML (Unified Modeling Language) diagram of FIG. 11. In FIG. 11, the upper portion of the diagram depicts the interfaces from which the various nodes are derived. The three dashed boxes depict the derivations of services 50, Aliases 52, and Ions 54, respectively. Examples of classes from which node objects are actually instantiated are illustrated in a lower portion 56 of the diagram. These classes necessarily inherit their basic attributes and functional methodology from the interfaces depicted in the upper portions of the diagram.

In accordance with FIG. 11, all nodes inherit from the Node Interface 58. The Node Interface 58 includes "name" and "parent" attributes, such that all nodes, inheriting from the Node Interface 58, include those attributes, i.e., all nodes depending from the Node Interface will be required to have a "name" (their name) and a "parent" (in this case the top level Node). In addition, all nodes inherit from a Configurable Node Interface 59 and, consequently, inherit "configuration," "configure" and "reset" methods, in addition to the "name" and "parent" attributes inherited from the Node Interface. This is so since all nodes must be configurable during a configuration process.

It should be noted that the interfaces depicted in the exemplary diagram of FIG. 11 are shown as providing only the minimum attributes and methods that node objects are required to have. This is for purposes of ease of illustration and simplicity of description. It will be evident that other attributes and methods may be added as they are deemed necessary by a system designer and can be incorporated during system configuration. However, allocating minimum node attributes and methods is a highly advantageous design feature of the framework architecture, since it allows the software application to build a system configuration dynamically at system startup. As will be described in greater detail below, system software is not required to know in advance what the final system configuration will look like.

Returning now to the exemplary embodiment of FIG. 11, service node derivation is described in connection with the enclosed Services region 50. As was described above, services are nodes that perform an action and service nodes are instantiated from classes that inherit from the Service Interface 60. The Service Interface 60 depends from the Configurable Node Interface 59, in turn depending from the Node Interface 58. Service nodes thus include "start" and "stop" methods in addition to the above-described attributes and methods inherited from the Node and Configurable Node interfaces. "Start" and "stop" methods define the two main functional calls that are available to a user or operator who wishes to invoke any particular service. Service utilities are written and stored in an application database awaiting activation. To run a service, a user or operator sends a command to "start (service.fil)", where service.fil is the file name of the service to be run. Naturally, the complete file name will have a URL-like structure, as will be described further, and may be designated by an alias, as well. The command "stop (service.fil)" stops the service utility from running.

Alias nodes are derived in a manner described in connection with the enclosed area 52 of FIG. 11. As described previously, an Alias node is used to assign an alternative name to another node. Consequently, there is no Aliases interface, since an Alias node is used only to redirect a user to a "functional" node. Alias nodes do not require attributes or methods of their own. Alias nodes depend from the Service Interface 60 and a Composite Node Interface 62, both of which depend in turn from the Configurable Node Interface 59 and the Node Interface 58. Thus, Alias nodes are instantiated from classes that inherit from both the Composite Node Interface and from the Service Interface and consequently have the attributes they inherit from those interfaces, in addition to attributes and methods inherited from the Node and Configurable Node Interface.

The Ion node definition portion 54 includes a Composite Node Interface 62 and an I/O Node Interface 64, both of which depend from the Configurable Node Interface 59. Composite Node Interface 62 sets inheritance characteristics for device nodes 66, as well as alias nodes 68 and point nodes 70. Device nodes are Ions that have, or are able to have, a child node or children nodes, including ports such as the hardware systems I/O ports, handlers or drivers such as the Modbus handler and personalities such as a Veris meter. Further, device nodes may be composite nodes, which is defined as a node able to contain other nodes which may also be composite nodes. For example, any node capable of having children, is a composite node. A port, such as an RS-232 port, may subsume a Modbus handler, as well as a Veris meter. Points defined by the Veris meter may also be identified by Aliases and may further be accessible to service nodes, such as a data logger. Thus, device nodes are instantiated from classes that inherit from the Composite Node Interface and include methods such as children_names, children_nodes, and get_child, in addition to attributes and methods inherited from the Configurable Node interface 59 and Node interface 58.

Children_names, children_nodes, and get_child refer to methods by which children nodes add themselves to parent nodes, and by which a parent returns a list of all the nodes that are its children. This is particularly useful in the configuration process, where a simple mouse click is sufficient to create a parent/child relationship. The mouse click invokes the set of methods that are associated to the particular node which has been clicked, and the methods associated thereto carry out the functional assignment.

Point nodes include data acquisition devices such as temperature sensors, as well as monitor and control points in "personalities" such as those found in GeneracDG50 generators. Point nodes are instantiated from classes that inherit from both the Composite Node Interface 62 and I/O Node Interface 64. In accordance with the I/O Node Interface definition, device nodes include bind_event, get, get_result, and set methods in addition to attributes and methods and inherited from the Node, Configurable Node, and Composite Node Interface. In other words, all an operator need do to fetch a value is to issue a "get" command; issue a "set" command in order to adjust a value. Commands may be scripted in a service utility routine, that has its own "start" and "stop" metrics, or might be commanded directly.

Translator nodes are instantiated from classes that inherit from the I/O Node Interface 64 and define nodes that convert raw data into conventional units, such as degrees Fahrenheit. Translators are necessary utilities once it is understood that many devices communicate nothing more than current or voltage levels which must be translated from machine-understandable form into a human-understandable context.

The various attributes and methods assigned to the various interfaces described above allow for an inherently simple architecture to be made structurally elegant. Lower level, "end point" nodes are defined in terms of attributes and methods that pertain solely to their functionality and do not incorporate operational or functional metrics that have no bearing on their use. For example, there is no conceptual requirement for a device to be capable of responding to a "get," "set" or "get_result" method, since these methods are immaterial, and therefore unintelligible, to a device. In contrast, "points" and "translators" are required to be responsive to these methods, since the methodology is directed specifically to data associated to a "point" and which might be required to be translated by a "translator." Similarly, devices, points or translators are not intended to be start/stop responsive as might be a service utility, for example. However, and as will be described in detail below, all nodes are intended to be responsive to "configuration" and "configure."

Operationally, the concepts, features, architectures and structure described above will be discussed in the context of creating a system implementation by performing an initial system configuration process. The environmental control system's application suite includes a system configuration tool that allows system installers and managers to specify the configuration details of the system they wish to construct. The system configuration tool interacts with various elements of the previously described hardware and software architectures to construct such a system through an interactive, menu-driven process.

In general, the configuration tool prompts specification of a particular host hardware system and then direct selection of the appropriate parameters for the ports defined by the host hardware and devices that the host hardware will operate. For example, if a user selects an RS-232 port, the configuration tool prompts for the port's baud rate and other applicable port parameters. The various port parameters available to a system administrator during configuration are well understood by those having skill in the art and need not be detailed any further herein. However, it is important to understand what types of ports are available on any particular piece of hardware and to adequately configure the available ports for proper operation. Port identification is a rather straight-forward process that involves interrogating the host system of which returns a basic port definition list from its hardware configuration list, developed by the operating system. The basis port definition list is stored in a configuration database, along with the various protocol and personality modules discussed above. The configuration tool uses the configuration database to specify the capabilities and requirements for each Ion definition. When a user configures an object for a site, the configuration tool lists the available options for each object based on matching parent capabilities to a child's requirements.

As will be described further, once a site configuration is specified, a configuration file is produced which describes the system configuration. At system startup, the framework application parches the configuration file and uses the information it contains to configure all of the nodes in the system; defining devices, port line handlers, and the like. Aliases trees are established and, at a minimum, configuration services and a "remote node access" service is enabled. In this regard, the configuration service allows the framework application to communicate directly with the configuration tool, such that configuration changes can be made even after system startup and while the system is running operationally.

Figure 12:
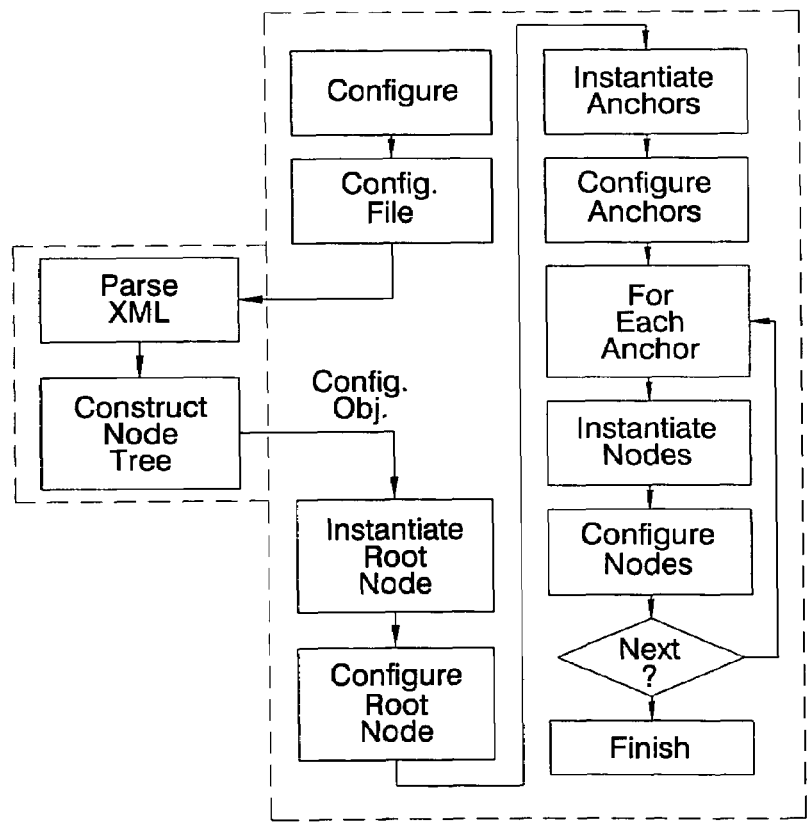
FIG. 12 is a simplified block-level flow diagram of one embodiment of a configuration process in accordance with the invention.

An exemplary configuration sequence is depicted in the flow diagram of FIG. 12, and begins when an environmental control system host boots and begins running. A startup program calls a "run" function which in turn calls a "configure" function. The configure function searches for a configuration file and, when found, the configure function parts as a configuration file and uses the resulting configuration data to build the tree structure (illustrated in FIG. 10), starting at the root. The function returns the root configuration object which contains all the necessary information to configure each node in the tree.

The configure function instantiates and configures the root node by invoking the node's "configure" method and passing it the configuration data contained in the configuration object. The configure function sorts the children immediately under the root (the Ion, Services and Aliases anchors) in that order of creation priority. The configure function instantiates and configures each anchor in turn and then iterates over each anchor's tree, instantiating and configuring each node by invoking the node's "configure" method and passing it the configuration data contained in the configuration objection. The Ion tree is completed first, top to bottom, then the Services tree, then the Aliases tree, and any other custom, user-created trees. When the entire tree structure has been instantiated and configured, the framework application calls a "start" method on the services anchor which, in turn, starts all of the Services children.

For simplicity and programming flexibility, the configuration file is generated in XML (Xtensible Markup Language). An exemplary XML configuration file is shown in FIG. 13. In the exemplary XML configuration file, the tree structure is represented as nested configuration data, with the first line of the file identifying a host. The host has various configured properties, including "host," "IPaddress," "DNS_server" and the like. These property name values function to configure the host as an addressable entity with quantitative address indicia.

The next nested node name identifies the Aliases node and further identifies the software module that performs the Aliases functions.

The next node name, at the same level, identifies the Ion node and further includes a plurality of nested node names which identify the various I/O ports comprising system hardware. It will be understood that certain ports are not property configurable and those ports do not define any nested properties. However, ports such as "port 1 node_id=2," an RS-232 console port, have configurable properties such as baud rate, parity value, bits value, and the like. Such ports contain nested "property name" configuration values.

Likewise, Services nodes are defined at the same nesting level as Ion nodes and Aliases nodes and further comprise nested node definitions and property name values associated with children nodes.

Thus, from the exemplary embodiment of FIG. 13, it can be understood that the XML configuration file is structured in a manner that provides a programming code analog to the tree structure diagram of FIG. 10. The XML configuration file can be directly generated by a programmer type in code, or, as will be described below, can be generated by the system's configuration tool. Given the flexibility of XML, and its ability to interface and intercommunicate with off-site Internet capable communication tools, it will be evident to one having skill in the art how an XML configuration file can be particularly advantageous in enabling and supporting both direct and remote access to one or a multiplicity of environmental control system hosts by a remote user having simple Internet access.

Constructing a configuration file initially requires selection of a particular host device for which the configuration file will pertain. Configuration file creation is an interactive, menu-driven process by which a user selects options and commands from various menus and dialog boxes generated by the configuration tool application through a GUI (Graphical User Interface). Where the configuration tool is hosted on a remote system, such as a PC communicating with enterprise-wide establishments over a server coupled through the Internet, a list of available host devices may be generated by "pinging" the establishments and obtaining a list of all host devices coupled thereto. Preferably, the host devices will be configured in accordance with the environmental control system discussed in connection with the exemplary embodiments of FIGS. 3 and 4, such that a standardized set of I/O ports and software services is ascribed to the host devices comprising the list. Alternatively, each host device not so configured will be able to provide the configuration tool with its own I/O hardware list and installed service utility routines.

Figure 14:
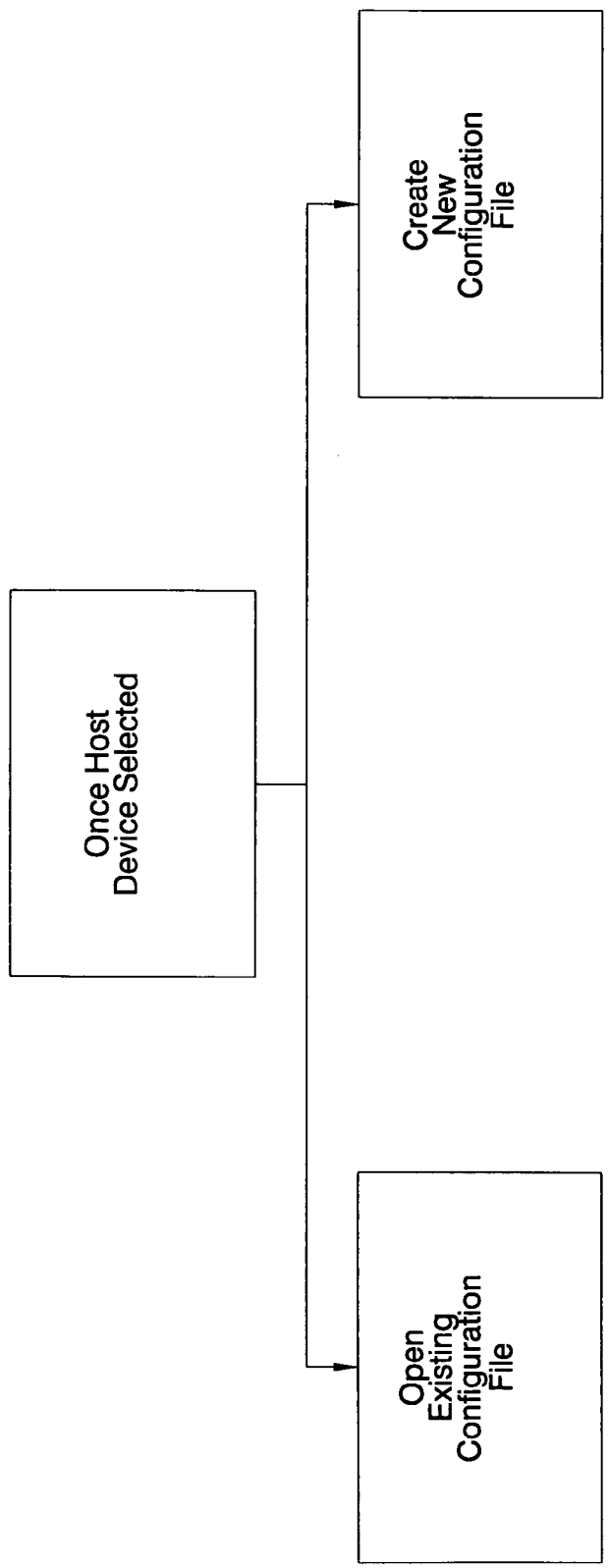
FIG. 14 is a simplified block-level flow diagram of a second embodiment of a configuration process in accordance with the invention.

In accordance with the exemplary new configuration process flow diagram of FIG. 14, once a host device has been selected, a user may either open an existing configuration file for that host or create a new configuration file. An existing configuration file either resides in a file on the network, or the file may reside in system memory on an environmental control system in accordance with the invention. A user might wish to open an existing configuration file in order to modify the file or to add additional devices, services or aliases to the file's node definitions or to modify device properties or "point" properties as where more capable facilities equipment enters the marketplace.

Figure 15:
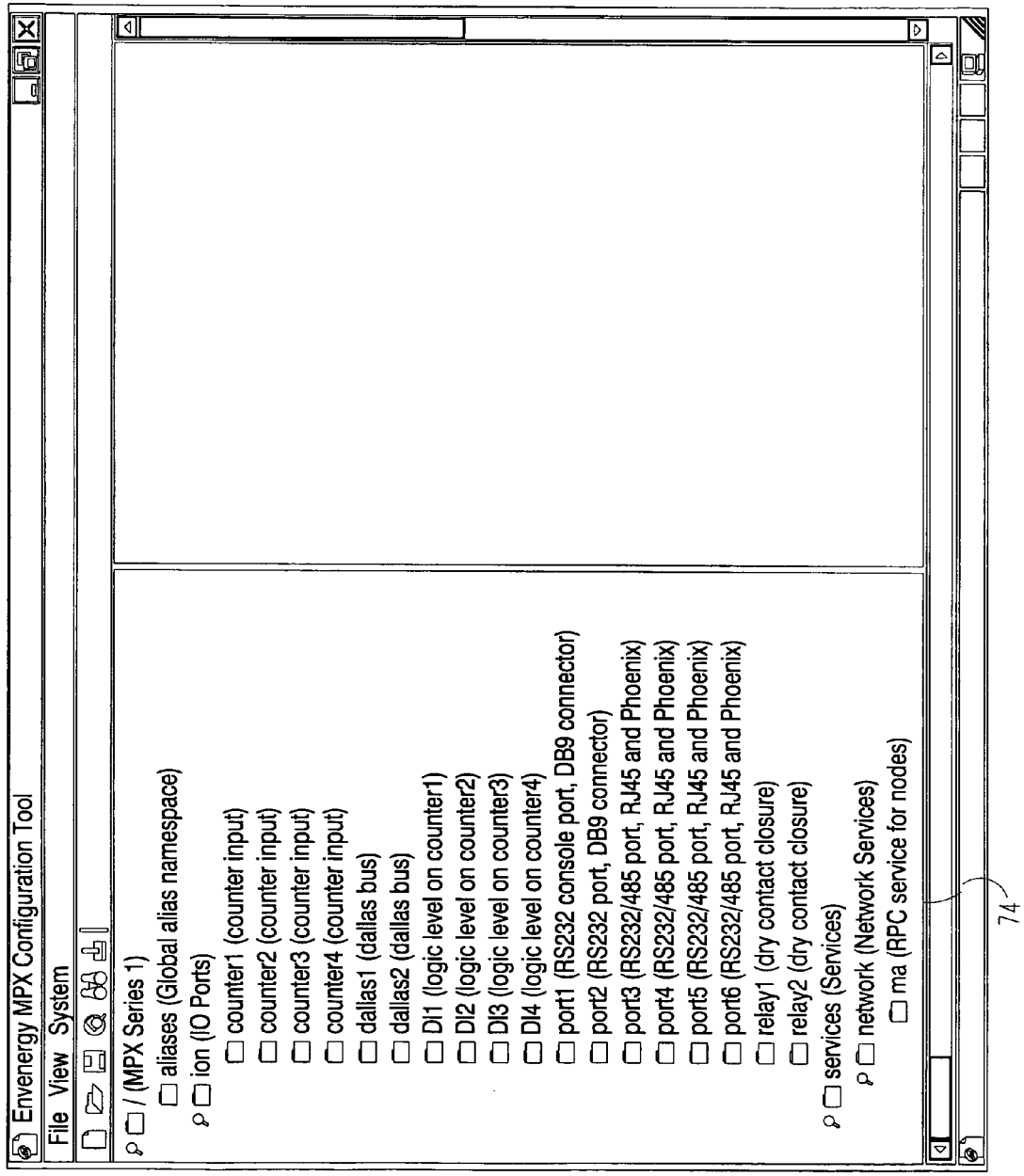
FIG. 15 is an exemplary screen shot illustrating a first stage of an interactive configuration process.

As a configuration file is opened (whether new or existing) the tree structure of the specified configuration appears in a node tree window of the configuration tool's screen, as depicted in the exemplary screen shot diagram of FIG. 15. Display of the tree structure may be expanded or collapsed, so as to show different depths of the tree structure. In FIG. 15, it is assumed that the Aliases node has no children, while the Ion node contains children nodes that identifies the different I/O ports pertaining to the host. Similarly, the Services node includes a child termed "network" which identifies the network services available for the host.

Figure 16:
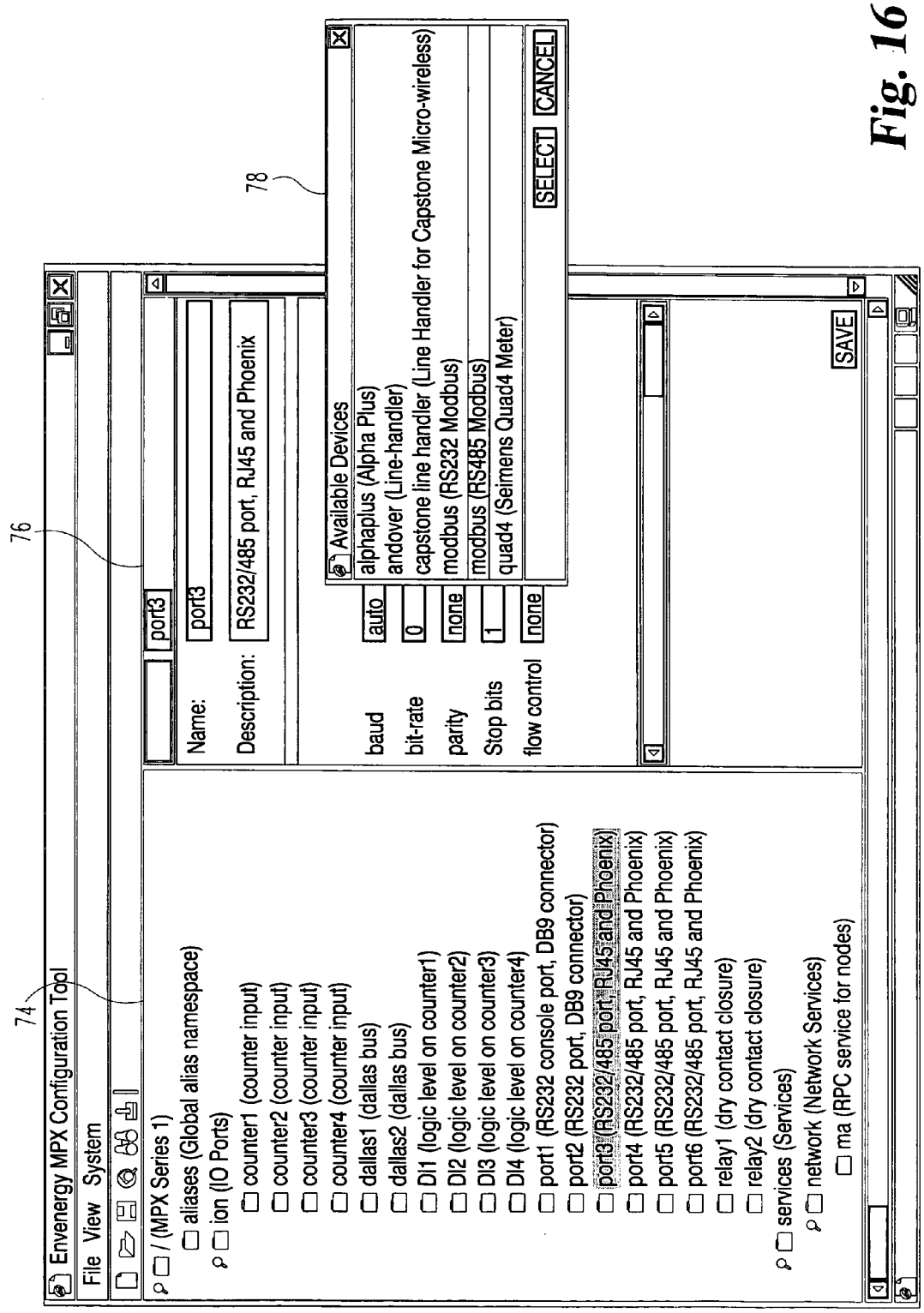
FIG. 16 is an exemplary screen shot illustrating a further stage of an interactive configuration process, including protocol module selection.

In order to configure a new node, the user selects a node which will be the parent of the node they wish to configure. For example, and as depicted in the exemplary screen shot of FIG. 16, the user wishes to have an RS-485 port coupled to communicate with and control a particular device (a Veris 8035 meter). Currently, none of the I/O ports are configured to operate with an associated device, so the user is free to choose any RS-485 compatible port to communicate with the meter. The user need only select the port (click on the port definition) display the port properties in a properties window 76 proximate the node tree window 74, as depicted in FIG. 16. In the properties window 76, the various port parameters can be configured to optimize port performance for communication with the desired device. Such port properties include the baud rate, bit size, parity, the number of stop bits and flow control. All of these properties are settable through dropdown windows that contain selectable options for each of the port properties.

Selecting a parent node allows a user to add a new "device" to that node from a list of available devices associated to that type of parent node. The available devices list 78 may be generated by the simple action of a user selecting a parent node or, alternatively, by having a user select a parent node and then affirmatively requesting the available devices list 78 by clicking on an "add new" icon in a toolbar, for example. However initiated, the available devices list suitably comprises only those devices which are capable of functioning on the selected port. Selection of an RS-485 port will not show any devices configured to operate on a Dallas port, nor show any counters or relays. Suitably, the available devices are line handlers, defined by the various corresponding protocol modules. Thus, in the exemplary embodiment of FIG. 16, an RS-485 port supports Alphaplus, Andover, Capstone, Quad4, and Modbus communication architectures.

Figure 17:
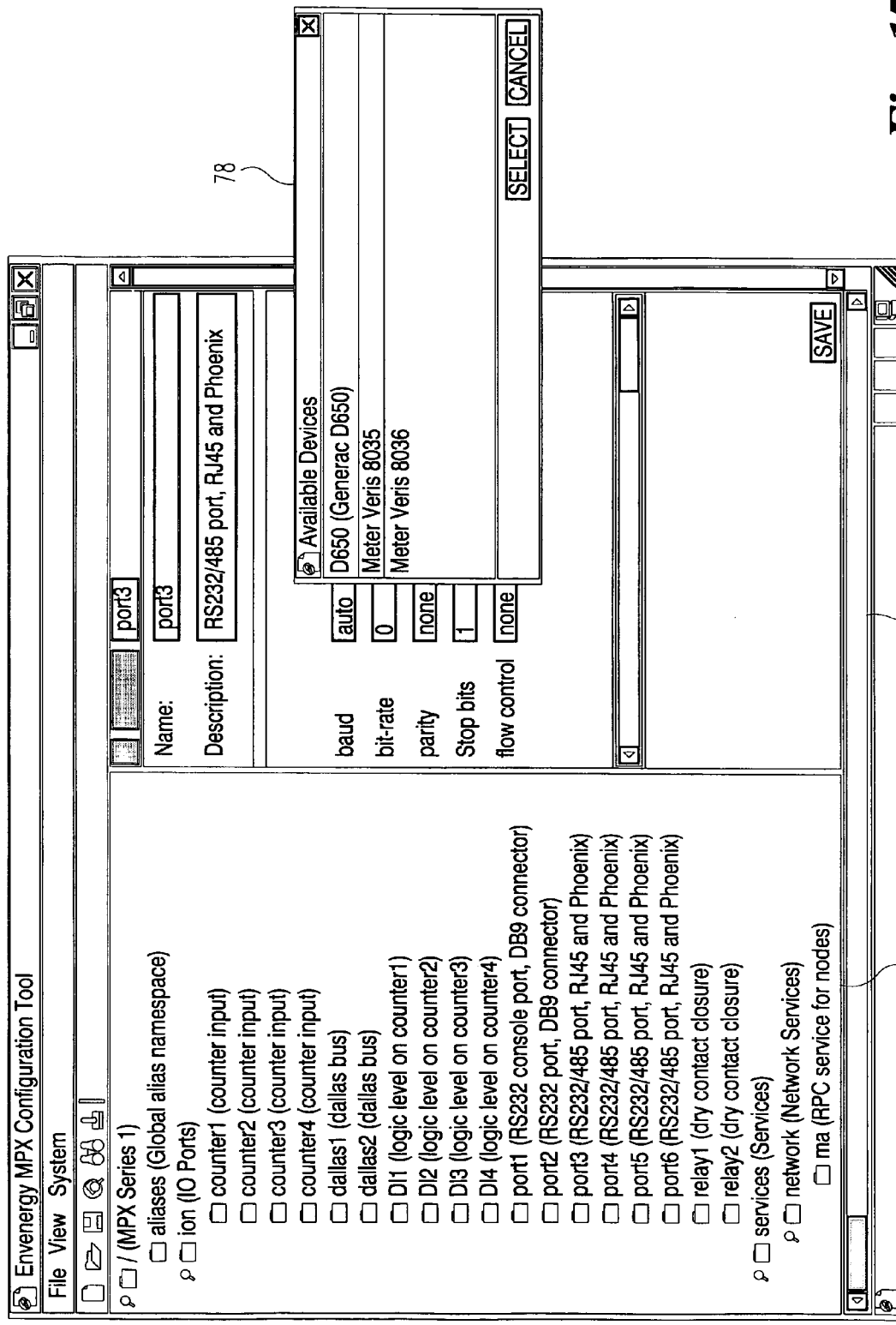
FIG. 17 is an exemplary screen shot illustrating an additional stage of an interactive configuration process, including personality module selection.

A particular device type of the child node to be configured is chosen from the available devices list (RS-485 Modbus, for example) and selected as the communication protocol for the parent node. Upon selection, the device node appears in the node tree as a child to the selected RS-485 port. As the Modbus node is selected, an available devices window again opens but now includes a list of personality types that are compatible with the chosen protocol. As depicted in the exemplary embodiment of FIG. 17, the available devices window 78 now indicates that three personality types are available for coupling to the RS-485 Modbus device; a Generac DG50 generator, a Veris 8035 meter and a Veris 8036 meter. Suitably, the personality types are derived from the personality modules, each of which suitably identifies only those protocols with which it is compatible. Thus, selection of a particular port definition defines those protocols with which that port is compatible, selection of a particular protocol defines the personalities with which that protocol is compatible.

Figure 18:
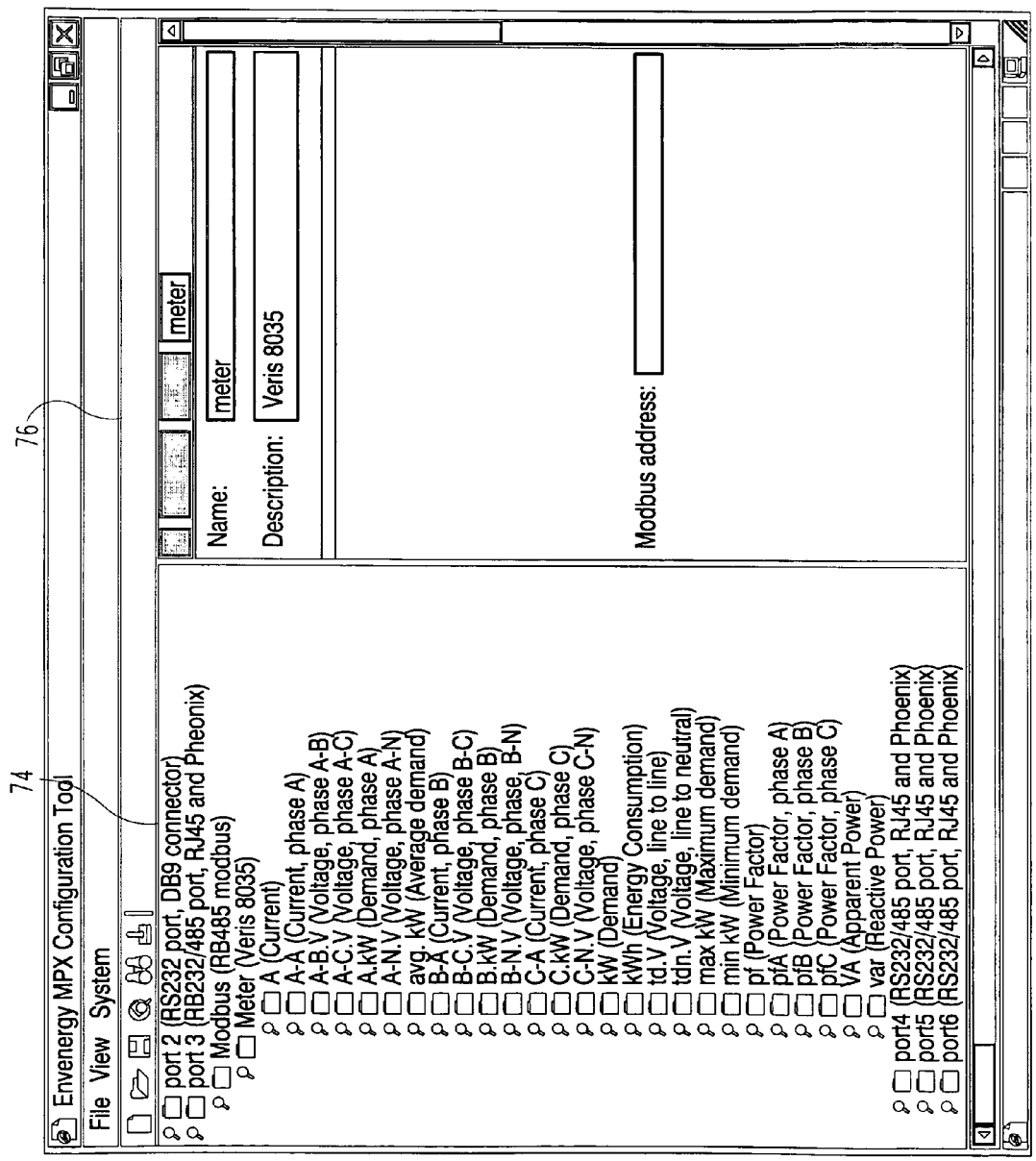
FIG. 18 is an exemplary screen shot illustrating yet another stage of an interactive configuration process, illustrating automatic "point" definition and capture.

As a particular personality type is selected (a Veris 8035 meter, for example), the new personality node appears in the node tree, and the data points that belong to that personality are added to the node tree automatically. The population of data points are comprised in the Veris meter's personality module and are automatically extracted for configuration node tree population. To view each of the data points, a user need only select the personality node and expand the node view, as is depicted in the exemplary screen shot of FIG. 18.

The process is repeated for each of the I/O nodes in turn until a complete definition of the system is made. Any and all of the hardware ports that are connected to physical facilities devices are now configured to operationally control those devices in accordance with an appropriate communication protocol. Once the system is configured, an operator or user is now able to access any one of the physical devices within an establishment by directing an appropriate command to that device by addressing the command to the device's (or point's) URL address defined by the configuration structure. In this regard, once the configuration process is complete, the configuration file is saved in XML format for further modification, addition, deletion, or the like. All of the information that a user or operator needs to communicate with a device, or command the host to communicate with a device is contained in the host configuration file definition. The configuration file may be stored on the host itself or may be stored in a centralized server where it is accessible to a host over a network connection. The host operational software need only know the address and name of its configuration file in order to access the configuration information during operations.

It should be noted that the configuration tool is also able to display the configuration data in XML script. Although an iconic representation is conceptually simple and easy to use, at times a user or operator might wish to modify some of the characteristics of a port, protocol, personality, or point. An XML representation offers a direct, straightforward methodology for making simple changes and for adding custom properties or descriptive identifiers to a particular node.

To summarize, the framework application, including the configuration tool, allows an environmental control system to communicate with an attached device or upload data to a data center. It essentially provides the tools to enable a user or operator to do what they wish with the system. Classes are defined to represent each device in the system, including the system itself. The topmost parent is the host itself, which represents an environmental control system or the CPU that it is running on. The host has certain characteristics associated with it, such as an IP address, a host name, and the like and has children representing each one of the devices coupled to the environmental control system, such as ports. Each of the ports is also represented by a class and those classes are children of the host. Inside the I/O, classes represent each one of the actual devices such that port 1 has a class defined for it, port 2 has an associated class, as does the Ethernet port. These classes hold the configuration information for that given I/O and also provide the handles required to utilize that I/O. For example, if port 1 is contemplated as communicating with an Andover device, a class, representing the Andover device, is defined as a child of port 1. The Andover class (or Andover object) necessarily includes Andover configuration information that allows communication with the Andover device in order to move information back and forth in a uniform format, such that it can be utilized by service utilities.

Additionally, an Andover device may itself include a plurality of I/O. For example, it may have a temperature sensor that would be defined as one of the "points" children of the Andover class, as would a digital relay. The "point" children define structure from which a value may be obtained or a value may be set and are consequently defined with "get" and "set" methods. The get method might return an integer value, such as a 0 or 1, if a relay is open or closed, for example, while a set value allows the device to be turned on and off by setting a 0 or 1 value. If the device is a temperature sensor, the get method returns a Fahrenheit temperature, for example, while a set might adjust a Fahrenheit temperature threshold value. A user or operator understands that functional calls will include either a "get" or a "set," but the device will always return a value that makes sense for that given device (temperature sensor or relay).

The foregoing allows a uniform representation of all devices and all values, i.e., all actual information sent to and returned from sensors, meters, and the like, in a uniform way, which allows for definition of service and utility programs that are able to use these values indiscriminately. If a device is supported by the environmental control system of the invention, the system need only call a "get" function or a "set" function to get and/or set a value for a particular device whether it be a temperature sensor or a relay, and whether the relay, for example, resides on an Andover device or on an Adam module. Since information from disparate devices and sensors are made uniform, service utilities may be defined that gather the data and manipulate it into forms suitable for analysis or inclusion in a database. Information can be taken from DG50 generator, along with information from Andover temperature sensors in the same format, and in accordance with the same methodology, by calling the "get" method and then analyzing the complete collection of results.

In a manner substantially similar to protocol modules and personality modules, the framework application includes a plurality of Services which are a collection of utility programs or applications that a user or operator defines that allows the system to perform certain tasks. Suitably, every module component, whether it is a protocol module, a personality module or a service, has a web presence by virtue of the URL-like file structure definition, i.e., ://hostname/restofpath. The service portion of the name tree contains the general concept of Services. Services are configurable nodes, meaning they inherit the "configure" method, but the only methods specific to a service are a start method and a stop method. Conceptually, a Service is simply a collection of logic that performs a function. A Service may be commanded to start performing that function or to stop performing that function. Typically, Services interact with Ions, but this is not required. In addition to start and stop methods, Services might include a series of methods that are specific to the particular defined service. For example, where the service is a data logger, the logger might include methods for extracting ranges out of a collection of logged data, adding additional entries to a log, or the like.

Further, Services necessarily include a collection of network utility application programs that allow the system to communicate over an Internet connection. Utilization of various services and how they interact with other components of the framework application will be more completely understood when considered with respect to the following description. Initially, it is assumed that a remote user or operator makes a request to obtain a particular value for a particular device configured into an environmental control system when operating a remote establishment. The user or operator makes a request to the device URL from a network browser, using an "alias" value to designate a particular desired point. The URL is directed through the Internet to the specific system host identified in the URL which recognizes the communication as an Internet communication and invokes a "network" service, disassembles the packet, removing packetization and calls a subservice, the HTTP service to remove HTTP: and parse the address.

Upon recognition of the address, a "point view" service is called that performs the iterative search (described above) for the node having the particular defined address. Once the node is determined as unknown, and the node designation is an alias, an "alias" service is called which fetches the remainder of the structural address (i.e., the structural address associated to the alias name) and directs the query to the particular device through the corresponding port, protocol module, and personality module. If the user or operator was querying for energy consumption, the query would include a "get" method command with the variable argument being KWh. The protocol module recognizes that "get" KWh pertains to a particular control code implemented by the protocol. The device's personality module recognizes that KWh corresponds to the contents of a particular register set implemented in the device. The personality and protocol modules, in combination, translate the "get KWh" user command into a suitable protocol message which is directed to the device which returns the requested value.

Suitably, the requested value is nothing more than digital information contained in a register and which might be contained in multiple registers if the value is floating point, for example. Accordingly, this information must be translated into a form suitable for display to a user or operator in a human intelligible manner. Translation objects process the information and return the resulting value to the system for transmission to the user. Such transmission is essentially the reverse of the services processed, with the HTTP service addressing the information to the querying user and the network service packetizing the return string for transmission over the Internet to the user's browser.

The foregoing was an exemplary description of a service utility that might be termed remote node access. Remote node access (RNA) is a service object that might be implemented as a child of "network" services, since remote node access contemplates node accessibility by an off-site user or operator over a network. The function that the RNA service performs is to parse and direct remote node access requests made from an off-site user. Node access requests can be made both from the host being affirmatively addressed, or through the host being addressed to a remote node coupled to a different host. For example, it will be presumed that a user or operator wishes to obtain the energy consumption value from a Veris 8036 meter, coupled to port 3 through a Modbus protocol module. Accordingly, this "point" might have an address:

/ion/port3/modbus/veris/KWh.

If this is a data point often requested, the user or operator might have assigned an alias to the point such that the point address might be /"alias"/KWh. The user command is established as:

"get val ("/"alias"/KWh")"

in the case where energy consumption values are taken from a directly addressed host or might be established as:

"get val ("RNA://host2/"alias"/KWh")"

in the case where the desired value is to be extracted by the addressed host from a further, remote host.

In similar fashion, values may be "set" for the various points comprising a remote system by either directly addressing a specific host or by using a directly addressed host to remotely access nodes on further hosts. For example, in order to turn off the lights in New York, a user or operator would establish a command such as "set ("/lights;0")" where "lights" is an alias for a relay port, for example, and where the relay port resides on the directly addressed host. Alternatively, the directly addressed host might be commanded to perform this function on a secondary, remote host in the context of running services or other executable commands itself. Such a remote node access command might be established as follows:

"set ("RNA://NY_host/lights;0")"

again assuming that "lights" is an alias for a particular relay port on NY_host.

A further exemplar of remote node access describes how a particular routine can be constructed to control light switching in a multiplicity of establishments, each of which are operated by a different, remote environmental control system in accordance with the invention. In a manner that will be familiar to those having even ordinary skill in the programming arts, various utility routines may be written and established in utility libraries from whence they are callable. For example, a routine termed "as_node" might be defined that effectively compels an argument to be treated in a particular manner, in this case it would compel each occurring instance of an iterating string address to be treated as though it were a node. "As_node" is stored in a library file and imported as necessary.

A multiplicity of establishments (i.e., stores) is defined as a sequential set of host system addresses;

stores='host1, host2, host3'

For each "store" in a multiplicity of stores, a function "lights" is defined that either turns the lights on or turns the lights off in each store. Suitable code to perform this function might look as follows:

Lights=as_node('host://"+store+":rnanp/ion/relay1')
Lights.set                                                            (1)

Where the term RNANP refers to the remote node access network port number. The foregoing code turns the term "lights" into a node. As described above, nodes have attributes, one of which is "set," the node "lights" is set to 1, indicating that the lights in the collection of "stores" are to be turned on. Setting the value of "lights" to (0) turns off the lights. It will be understood by an ordinary programmer that libraries contain timing utilities and these timing utilities may be used in combination with "get" and "set" methods to schedule the on/off sequences and timings for the multiplicity of stores comprising the enterprise.

Suitably, the aforementioned can be set up as a service which is added to a particular system configuration by selecting the Services node in the configuration tool and then proceeding in a manner similar to that described in connection with the Ion node tree. In this regard, the system might automatically populate the top-level Services node with network and configuration services and have RNA, HTTP, and data logger service routines available to become children to the Network Services node. Each of these, in turn, would be associated to a rationally related list of further children, with relationships defined by a user or operator.

Thus, the RNA node might have a quite substantial list of service utilities, created by a system administrator, that would be able to inform and operate an enterprise-wide set of establishments. Given a system with the structure and functionality described above, it will be clear that changing operational imperatives, such as time-varying load curtailment schemes, can be very easily incorporated into even a nationwide enterprise. Because each of the individual environmental control systems are identified as a unique host, operational services need only be addressed to those unique hosts that are identified as residing within a specific geographical region within a particular load curtailment regime.

Load curtailment rule sets can be easily implemented by structuring a set of "get" and/or "set" commands, each directed to specific and appropriate ones of facilities devices coupled to the affected environmental control host systems. As a practical matter, node control methods can be scripted into a "service" that "starts" upon receipt of a command such as:

"start (/services/network/load_curtailment/sempra.fil)

when load curtailment from Sempra Energy is in effect. For routine and periodically determinable events, a particular load curtailment file may be "started" automatically in accordance with a timing parameter running on the host operating system. Thus, lights may be automatically dimmed or turned off after the close of working hours in any geographic locality. Similarly, thermostatic controls might be "set" to an energy conservative temperature range when building occupancy is reduced.

Finally, and in accordance with the invention, energy consumption and usage profiles may be analyzed in accordance with user constructed routines, by commanding a host, or plurality of hosts, to periodically log certain selected variables represented by "points." Logged data is stored in database files such that it may be retrieved by a remote user and the data contained therein used to construct tables, graphs, or other analytical result sets in order that trends might be identified that would allow for further energy conservation activities. A user is able to set logging for any condition. Data is logged, formatted and transported to the customer site (by ftp, HTTP, or the like) in accordance with service routines.

The foregoing description of the various systems and methods implemented in an environmental control system in accordance with the invention have been described in connection with various exemplary embodiments depicted in the figures. Although the foregoing description has been presented in the context of particular terminology, structure, or hardware implementation, it will be evident to one having skill in the art that various adaptations and modifications can be made to the terminology, structure, or hardware implementations without departing from the scope and spirit of the present invention. Indeed, much of the software application methodology is described in terms of object oriented programming techniques which are commonly understood and utilized by most programmers. However, although this offers a simple and flexible approach, it is not strictly necessary for the implementation of an environmental control system with the features and advantages of the present invention. The operating system need not be a Linux Kernel. System software could be architected to run on any one of a number of different operating systems if the need arises. Indeed, the system could conceptually be ported from one operating system to another, as a routine matter, by a suitably skilled programmer.

Accordingly, the foregoing description is not intended to limit the features, aspects and advantages of the present invention to the illustrated embodiment. These embodiments are simplified and are provided for purposes of illustration and ease of explanation, and are not intended to limit the invention, the scope of which is defined only by the appended claims.

What is claimed is:

1. An environmental control system configured for use in connection with a multi-facility enterprise, the system comprising:
    a microprocessor-based control host;
    a multiplicity of disparate environmental control devices, each control device operatively responsive to monitoring and control commands delivered in accordance with one of a plurality of disparate communication protocols;
    a multiplicity of I/O ports coupled between the control host and the multiplicity of control devices, the I/O ports including a plurality of communication bus implementations;
    a configuration database, including configuration files, each configuration file further comprising an identification of monitoring and control commands corresponding to each of the multiplicity of disparate environmental control devices; and
    an operational instruction set, the control host operatively responsive thereto, the instruction set controlling monitoring and operation of the multiplicity of disparate environmental control devices by determining an appropriate configuration for each control device and communicating corresponding monitoring and control commands to each device in accordance with its corresponding communication protocol over a selected I/O port.

2. The environmental control system according to claim 1, the configuration files further comprising:
    a set of personality module files, the personality module files defining I/O operational characteristics of a particular environmental control device;
    a set of protocol module files, the protocol module files defining a characteristic communication protocol of a particular environmental control device; and
    an association file defining an association between an environmental control device, a particular personality module and a particular protocol module.

3. The environmental control system according to claim 2, wherein the protocol module files further define a particular one of the I/O ports as supporting communication between the control host and an environmental control device in accordance with a defined personality module.

4. The environmental control system according to claim 3, wherein the communication protocols are selected from the group consisting of the Modbus, TCPIIP; BACnet, Ethernet, BACnet IP, BACnet MSTP, Dallas, DHCP, PPP, SNMP, and IPSec protocols.

5. The environmental control system according to claim 4, wherein the environmental control devices include HVAC, AC and DC power plants, lighting, and thermostat monitoring and control devices.

6. The environmental control system according to claim 3, the configuration database including:
    an environmental control system structural definition implemented as a node tree structure, the node tree structure further including;
    an initial object layer, the initial object layer defining nodes that define physical or logical interactions required to perform an I/O operation to an environmental control device;

a device handler layer depending from the initial object layer, the device handler layer comprising nodes each defining a particular one of the plurality of disparate communication protocols; and a device layer depending from the device handler layer, the device layer comprising nodes each defining a particular one of the multiplicity of disparate environmental control devices, wherein each device node depends from a particular corresponding device handler node.

7. The environmental control system according to claim 6, further comprising a data point layer depending from the device layer, the data point layer comprising nodes each defining characteristic I/O data metrics for an environmental control device.

8. The environmental control system according to claim 7, wherein the device handler layer nodes comprise protocol modules and wherein the device layer nodes comprise personality modules.

9. The environmental control system according to claim 8, wherein the node tree structure is accessed in accordance with a structural notation conforming to structural notational requirements of a URL.

10. The environmental control system according to claim 9, wherein the control host is coupled to a wide area network such that monitoring and control commands for a particular environmental control device are issued by an off-site user by communicating an I/O operational characteristic to the device by traversing the node tree structure with a command configured as a URL.

11. An environmental control system configured for use in connection with a multi-facility enterprise for operational monitoring and control of disparate environmental control devices operating in accordance with disparate communication protocols communicating over disparate interface ports, the control system comprising:

an environmental control system structural definition implemented as a node tree structure, the node tree structure further including;

a communication port layer comprising nodes each defining a communication interface characteristic of a particular one of the disparate communication interface ports;

a device handler layer depending from the communication port layer, the device handler layer comprising nodes each defining a particular one of the plurality of disparate communication protocols; and a device layer depending from the device handler layer, the device layer comprising nodes each defining a particular one of the multiplicity of disparate environmental control devices, wherein each device node depends from a particular corresponding device handler node.

12. An environmental control system configured for use in connection with a multifacility enterprise for operational monitoring and control of disparate environmental control devices operating in accordance with disparate communication protocols communicating over disparate interface ports the control system comprising:

an environmental control system structural definition implemented as a node tree structure, the node tree structure further including;

a communication port layer comprising nodes each defining a communication interface characteristic of a particular one of the disparate communication interface ports;

a device handler layer depending from the communication port layer, the device handler layer comprising nodes each defining a particular one of the plurality of disparate communication protocols; and a device layer depending from the device handler layer, the device layer comprising nodes each defining a particular one of the multiplicity of disparate environmental control devices, wherein each device node depends from a particular corresponding device handler node; and the environmental control system further comprising a data point layer depending from the device layer, the data point layer comprising nodes each defining characteristic I/O data metrics for an environmental control device.

13. The environmental control system according to claim 12, wherein the device handler layer nodes comprise protocol modules, the protocol modules defining a communication protocol operative over a particular one of the communication interface ports.

14. The environmental control system according to claim 13, wherein the device layer nodes comprise personality modules, the personality modules defining I/O operational characteristics of a particular environmental control device.

15. The environmental control system according to claim 14, further comprising:

a control host processing device; and an operational instruction set, the control host operatively responsive thereto, the instruction set controlling monitoring and operation of the disparate environmental control devices by determining an appropriate I/O operational characteristics for each environmental control device in accordance with its corresponding personality module and communicating corresponding monitoring and control commands to each device in accordance with its corresponding communication protocol over a selected communication interface port.

16. The environmental control system according to claim 15, wherein the node tree structure is accessed in accordance with a structural notation conforming to structural notational requirements of a URL.

17. The environmental control system according to claim 16, wherein the control host is coupled to a wide area network such that monitoring and control commands for a particular environmental control device are issued by an off-site user by communicating a characteristic I/O data metrics to the device by traversing the node tree structure with a command configured as a URL.

18. The environmental control system according to claim 17, wherein the communication protocols are selected from the group consisting of the Modbus, TCP/IP, BACnet, Ethernet, BACnet IP, BACnet MSTP, Dallas, DHCP, PPP, SNMP, and IPSec protocols.

19. The environmental control system according to claim 18, wherein characteristic I/O data metrics further comprise environmental device data variables that are "set" to a characteristic value, the environmental device operatively responsive to the "set" value, and environmental device data variables that are "read" so as to monitor the environmental device operation.

20. In an environmental control system configured for use in connection with a multifacility enterprise, a method for operational monitoring and control of disparate environmental control devices operating in accordance with disparate communication protocols communicating over disparate interface ports, the method comprising:

providing a microprocessor-based control host;

coupling a multiplicity of I/O ports to the control host, the I/O ports including a plurality of communication bus implementations;

coupling a multiplicity of disparate environmental control devices to the host over the multiplicity of I/O ports, each control device operatively responsive to monitoring and control commands delivered in accordance with one of a plurality of disparate communication protocols;

providing a configuration database, including configuration files, each configuration file further comprising an identification of monitoring and control commands corresponding to each of the multiplicity of disparate environmental control devices;

defining an environmental control system structure, the structure implemented as a node tree structure, the node tree structure defining step further including;

identifying an initial object layer, the initial object layer defining nodes that define physical or logical interactions required to perform an I/O operation to an environmental control device;

depending a device handler layer from the initial object layer, the device handler layer comprising nodes each defining a particular one of the plurality of disparate communication protocols; and depending a device layer from the device handler layer, the device layer comprising nodes each defining a particular one of the multiplicity of disparate environmental control devices, wherein each device node depends from a particular corresponding device handler node.

* * * * *